(12) United States Patent
Sasaki et al.

(10) Patent No.: US 10,140,006 B2
(45) Date of Patent: *Nov. 27, 2018

(54) METHOD FOR CONTROLLING INFORMATION APPARATUS

(71) Applicant: PANASONIC INTELLECTUAL PROPERTY CORPORATION OF AMERICA, Torrance, CA (US)

(72) Inventors: Takamitsu Sasaki, Kanagawa (JP); Eiichi Naito, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 378 days.

This patent is subject to a terminal disclaimer.

(21) Appl. No.: 15/132,586

(22) Filed: Apr. 19, 2016

(65) Prior Publication Data

US 2016/0231919 A1   Aug. 11, 2016

Related U.S. Application Data

(63) Continuation of application No. 14/547,700, filed on Nov. 19, 2014, now Pat. No. 9,354,798, which is a
(Continued)

(51) Int. Cl.
*G06F 3/0484* (2013.01)
*G06F 3/0481* (2013.01)
(Continued)

(52) U.S. Cl.
CPC .......... *G06F 3/04847* (2013.01); *A47H 5/02* (2013.01); *E06B 3/485* (2013.01); *E06B 9/32* (2013.01);
(Continued)

(58) Field of Classification Search
CPC .. G06F 3/04817; G06F 3/0481; G06F 3/0488; G06F 3/0484; G06F 3/04842
See application file for complete search history.

(56) References Cited

U.S. PATENT DOCUMENTS 5,650,800 A   7/1997   Benson
5,897,252 A   4/1999   Kanakubo
(Continued)

FOREIGN PATENT DOCUMENTS

CN   102289319 A   12/2011
JP   08-149575   6/1996
(Continued)

OTHER PUBLICATIONS

Office Action in U.S. Appl. No. 14/165,767 dated Apr. 29, 2016.
(Continued)

*Primary Examiner* — Namitha Pillai
(74) *Attorney, Agent, or Firm* — Greenblum & Bernstein, P.L.C.

(57) ABSTRACT

A control method is provided for controlling a networked information apparatus that includes a touch panel display. An electric shutter device is controlled over the network to open and close a shutter remotely. A processor of the information apparatus causes display of an operation icon on a display screen of the information apparatus, and the operation icon causes an operation screen for the electric shutter device to be displayed. When a swipe operation is sensed on the operation screen, a movement control command is output to the network for moving the shutter of the electric shutter device in a swipe direction of the swipe operation, in which movement of the shutter represented in the shutter image results in a changed representation of an object hidden by the shutter represented in the shutter image when the shutter image is in a closed position.

12 Claims, 30 Drawing Sheets

Related U.S. Application Data continuation of application No. PCT/JP2014/000772, filed on Feb. 14, 2014.

(60) Provisional application No. 61/766,843, filed on Feb. 20, 2013.

(51) Int. Cl.
| | |
|---|---|
| *G06F 3/0482* | (2013.01) |
| *G06F 3/0488* | (2013.01) |
| *H04L 29/08* | (2006.01) |
| *G08C 17/00* | (2006.01) |
| *A47H 5/02* | (2006.01) |
| *E06B 9/32* | (2006.01) |
| *H04L 12/28* | (2006.01) |
| *E06B 3/48* | (2006.01) |

(52) U.S. Cl.
CPC .......... *G06F 3/0482* (2013.01); *G06F 3/0484* (2013.01); *G06F 3/0488* (2013.01); *G06F 3/04817* (2013.01); *G06F 3/04842* (2013.01); *G06F 3/04883* (2013.01); *G08C 17/00* (2013.01); *H04L 12/282* (2013.01); *H04L 67/025* (2013.01); *A47H 2005/025* (2013.01); *G06F 2203/04808* (2013.01); *G08C 2201/30* (2013.01); *G08C 2201/40* (2013.01); *G08C 2201/50* (2013.01)

(56) References Cited

U.S. PATENT DOCUMENTS

| | | | |
|---|---|---|---|
| 6,057,814 | A | 5/2000 | Kalt |
| 6,160,359 | A | 12/2000 | Fleischmann |
| 6,909,921 | B1 | 6/2005 | Bilger |
| 7,730,223 | B1 | 6/2010 | Bavor et al. |
| 8,239,087 | B2 | 8/2012 | Dybalski et al. |
| 8,330,572 | B2 | 12/2012 | Rodriguez et al. |
| 8,380,359 | B2 | 2/2013 | Duchene et al. |
| 8,579,452 | B2 | 11/2013 | Diederiks et al. |
| 8,665,225 | B2 | 3/2014 | Herz et al. |
| 8,717,403 | B1 | 5/2014 | Kalevo et al. |
| 2003/0069665 | A1 | 4/2003 | Haag |
| 2003/0231197 | A1 | 12/2003 | Janevski |
| 2004/0260427 | A1 | 12/2004 | Wimsatt |
| 2005/0044511 | A1 | 2/2005 | Jong |
| 2007/0080940 | A1 | 4/2007 | Aoki et al. |
| 2007/0187042 | A1 | 8/2007 | Kallstrom |
| 2007/0229465 | A1 | 10/2007 | Sakai et al. |
| 2008/0191898 | A1 | 8/2008 | Janik |
| 2008/0238913 | A1 | 10/2008 | Katoh et al. |
| 2008/0316730 | A1 | 12/2008 | Diederiks et al. |
| 2009/0210110 | A1 | 8/2009 | Dybalski et al. |
| 2009/0271738 | A1 | 10/2009 | Glaser-Seidnitzer et al. |
| 2010/0031202 | A1 | 2/2010 | Morris et al. |
| 2010/0141602 | A1 | 6/2010 | Duchene et al. |
| 2010/0145485 | A1 | 6/2010 | Duchene et al. |
| 2010/0154124 | A1 | 6/2010 | Zerhusen et al. |
| 2010/0157124 | A1 | 6/2010 | Inoue et al. |
| 2010/0312366 | A1 | 12/2010 | Madonna et al. |
| 2011/0037712 | A1 | 2/2011 | Kim et al. |
| 2011/0246538 | A1 | 10/2011 | Boley et al. |
| 2012/0066608 | A1 | 3/2012 | Sundermeyer et al. |
| 2012/0083244 | A1 | 4/2012 | Verthein et al. |
| 2012/0218206 | A1 | 8/2012 | Sato et al. |
| 2013/0121510 | A1 | 5/2013 | Yuasa et al. |
| 2013/0127603 | A1 | 5/2013 | Choo et al. |
| 2013/0135234 | A1 | 5/2013 | Hisano et al. |
| 2013/0139102 | A1 | 5/2013 | Miura et al. |
| 2013/0346906 | A1 | 12/2013 | Farago |
| 2014/0002387 | A1 | 1/2014 | Hashiba |
| 2014/0040831 | A1 | 2/2014 | Akasaka et al. |
| 2014/0043791 | A1 | 2/2014 | Diederiks et al. |
| 2014/0236358 | A1 | 8/2014 | Sasaki et al. |
| 2014/0359468 | A1 | 12/2014 | Sasaki et al. |
| 2015/0074584 | A1 | 3/2015 | Sasaki et al. |
| 2015/0114574 | A1 | 4/2015 | Fiedler et al. |
| 2015/0339031 | A1 | 11/2015 | Zeinstra et al. |
| 2016/0096509 | A1 | 4/2016 | Ette et al. |

FOREIGN PATENT DOCUMENTS

| | | |
|---|---|---|
| JP | 10-220139 | 8/1998 |
| JP | 2000-138979 | 5/2000 |
| JP | 2000-291351 | 10/2000 |
| JP | 2002-300680 | 10/2002 |
| JP | 2003-348250 | 12/2003 |
| JP | 2004-166980 | 6/2004 |
| JP | 2007-104567 | 4/2007 |
| JP | 2009-213107 | 9/2009 |
| JP | 2009-301302 | 12/2009 |
| JP | 2010-158002 | 7/2010 |
| JP | 2011-094408 | 5/2011 |
| JP | 2012-050653 | 3/2012 |
| JP | 2012-231249 | 11/2012 |
| JP | 5128489 | 11/2012 |

OTHER PUBLICATIONS

Somfy: "Somfy Domotique: Decouvrez TaHoma de Somfy—Solution domotique pour piloter votre maison!", XP054975583, Nov. 5, 2010.
Extended European Search Report in EP 13821050.5, dated Feb. 11, 2016.
Extended European Search Report in EP 13874218.4, dated Mar. 9, 2016.
Extended European Search Report in EP 14754062.9, dated Mar. 9, 2016.
Written Opinion of the International Searching Authority in International Application No. PCT/JP2014/000772, dated Apr. 28, 2014, together with an English language translation thereof.
International Search Report (ISR) in International Application No. PCT/JP2013/002879, dated Aug. 6, 2013.
International Search Report (ISR) in International Application No. PCT/JP2014/000658, dated Apr. 8, 2014.
International Search Report (ISR) in International Application No. PCT/JP2013/005788, dated Jan. 7, 2014.
International Search Report (ISR) in International Application No. PCT/JP2014/000772, dated Apr. 28, 2014.
Avery, Yan. "MyDoorOpener-2.0.mp4", Jun. 6, 2012, YouTube video, https://www.youtube.com/watch?v=2L4TArAwTGk.
"Smart Garage Door Systems", Postscapes.
Avery, Yan. "MyDoorOpener-1.3.mov", Jan. 9, 2011, YouTube video, https://www.youtube.com/watch?v=iqFs5aXuzxY.
Non-final Office Action in U.S. Appl. No. 14/462,614, dated Jan. 4, 2018.
Office Action in U.S. Appl. No. 14/165,767 dated Aug. 5, 2016.
Office Action in U.S. Appl. No. 14/462,614 dated Dec. 19, 2016.
Office Action in U.S. Appl. No. 14/546,368 dated Feb. 27, 2017.
Final Office Action in U.S. Appl. No. 14/546,368 dated Jun. 16, 2017.
Feb. 8, 2018 Office Action in U.S. Appl. No. 14/546,368.

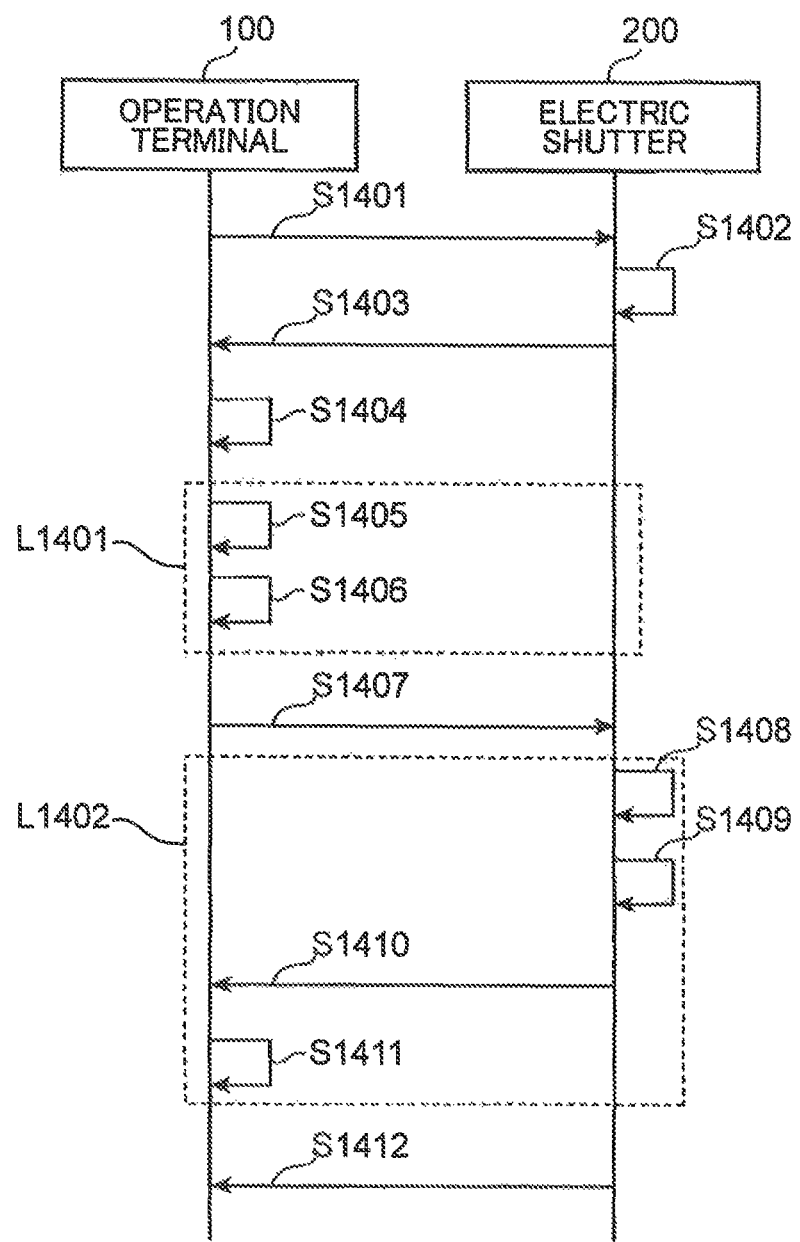

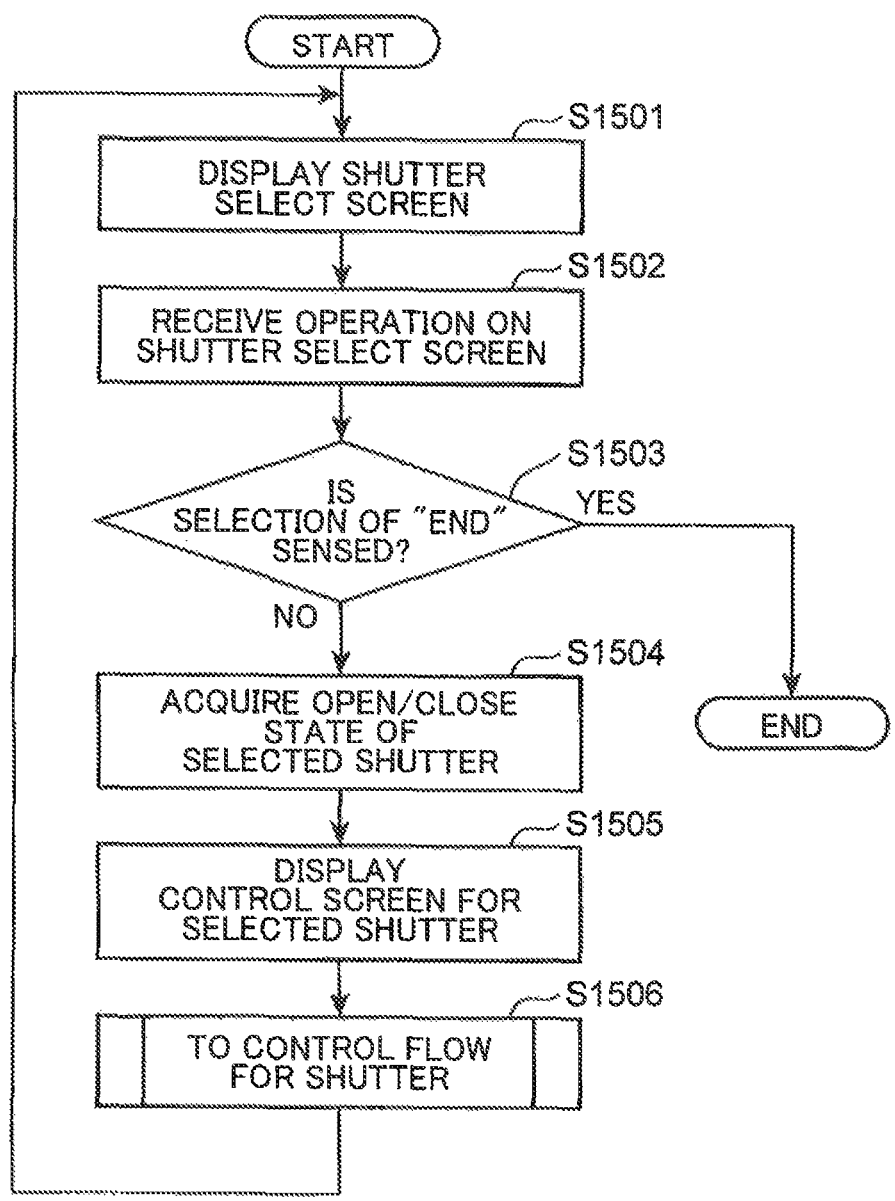

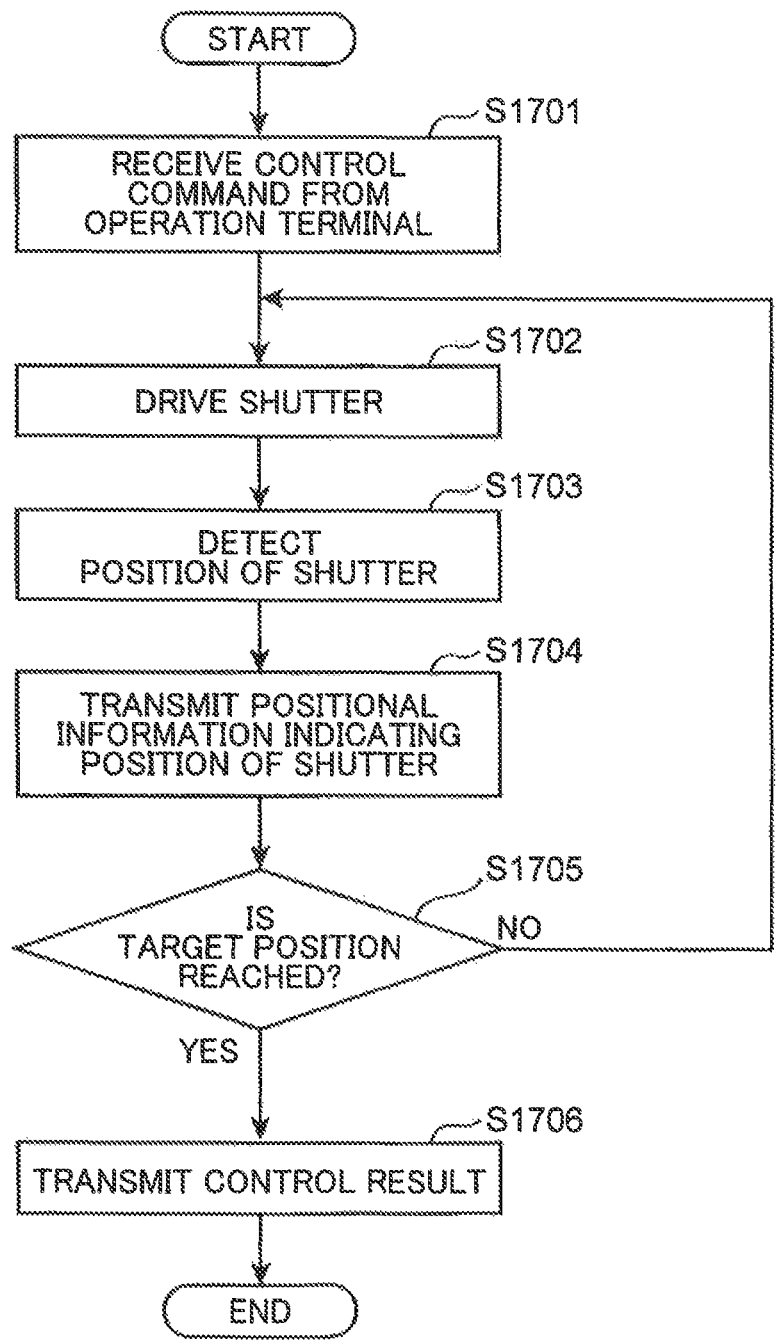

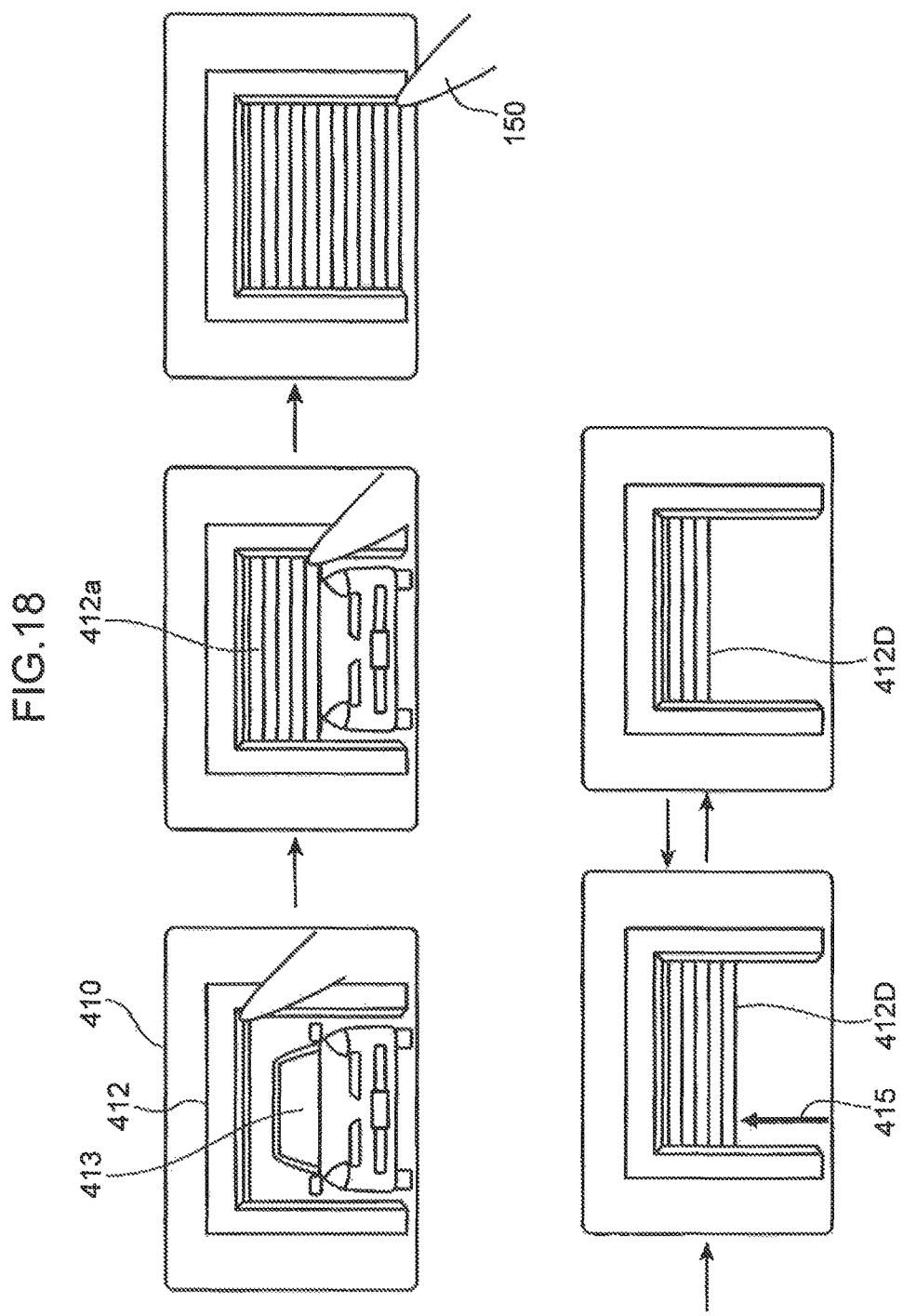

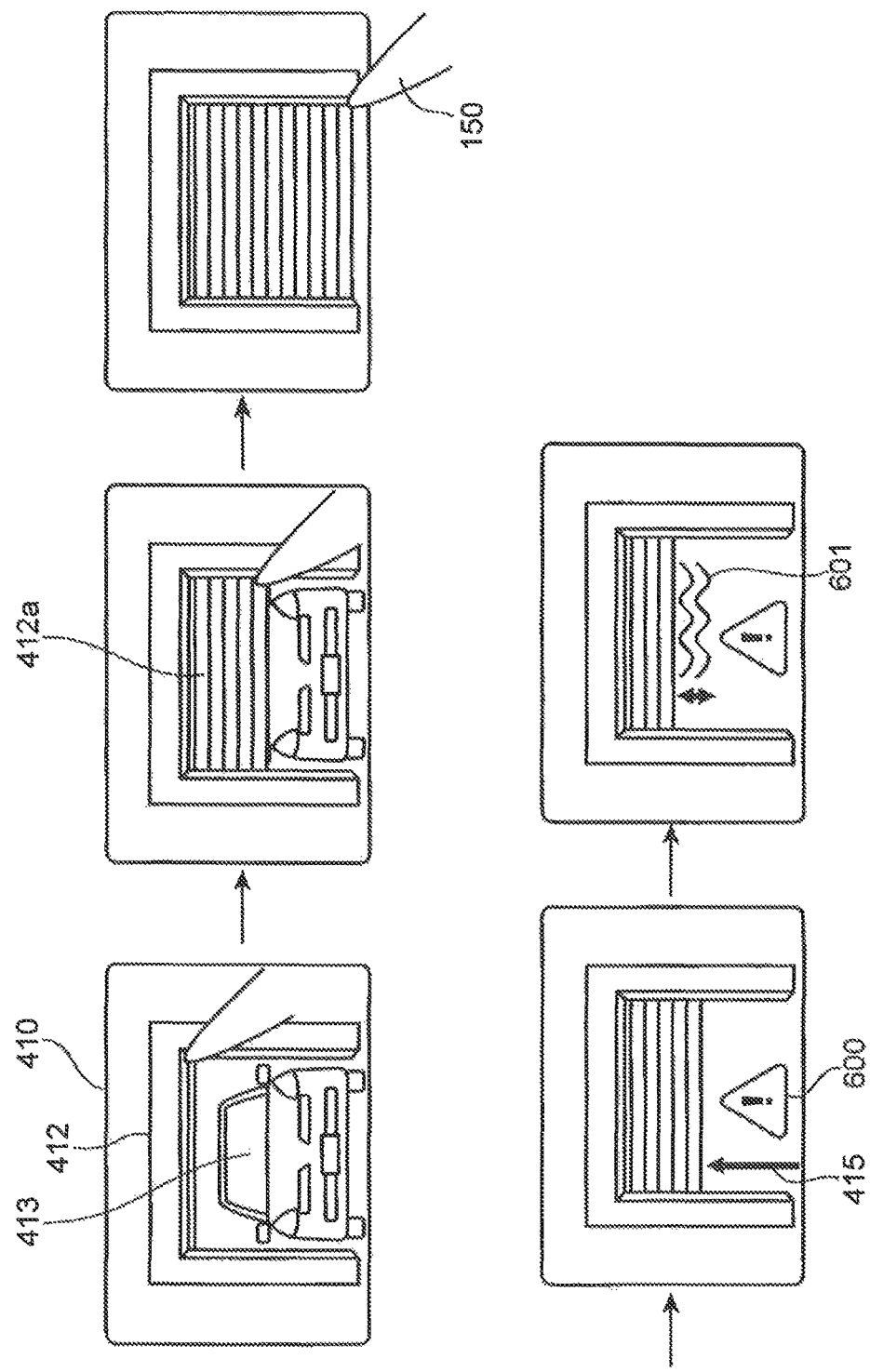

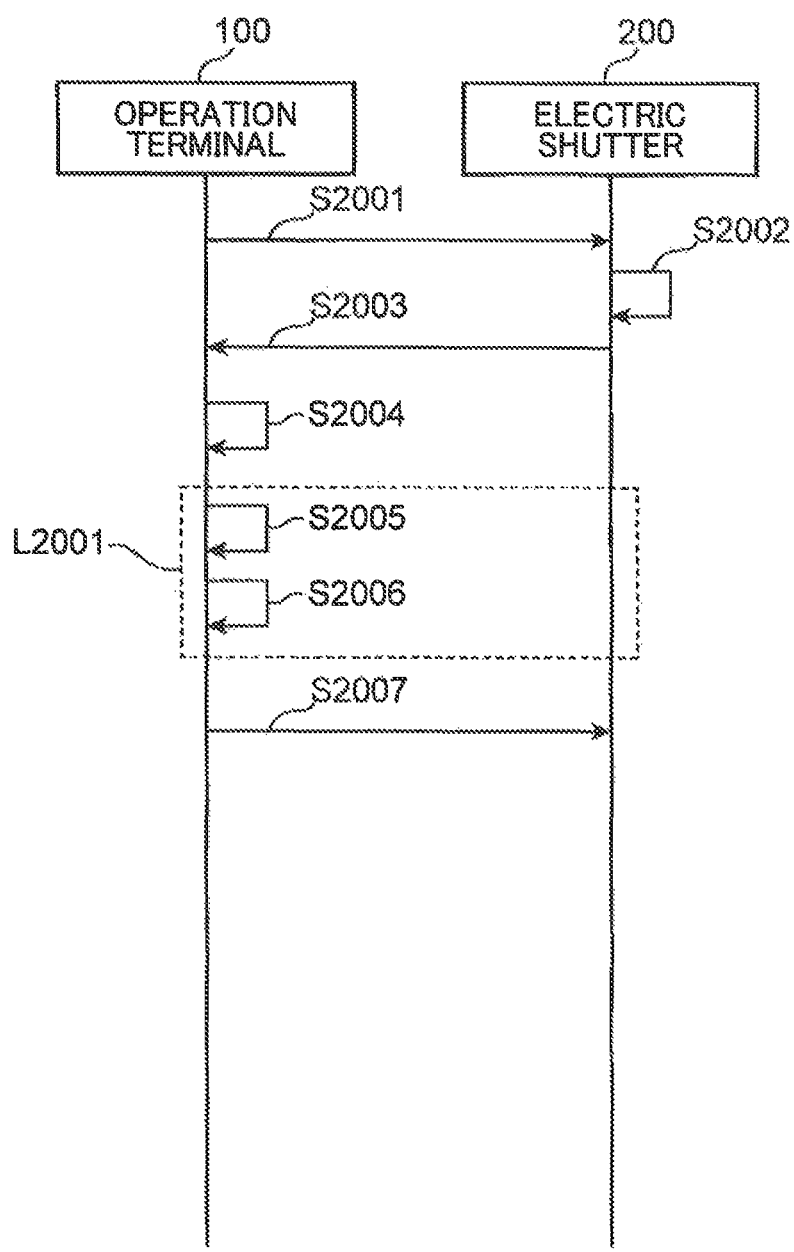

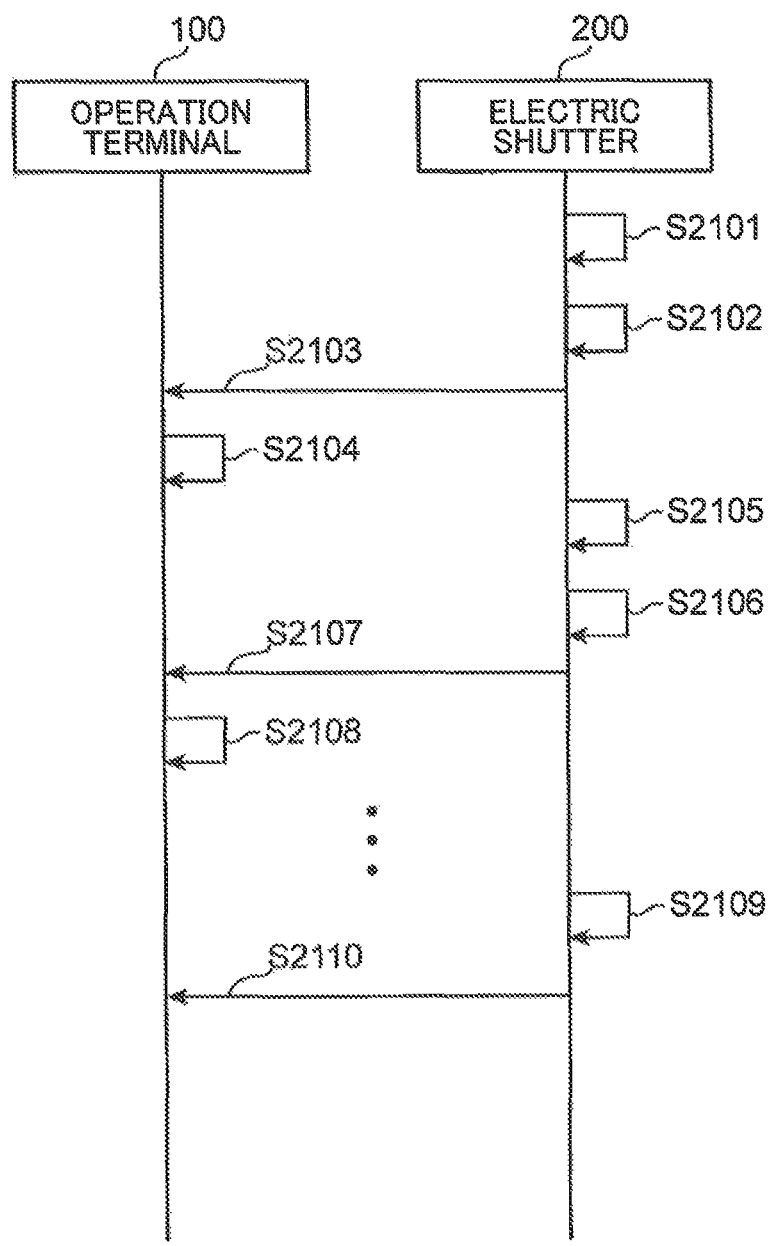

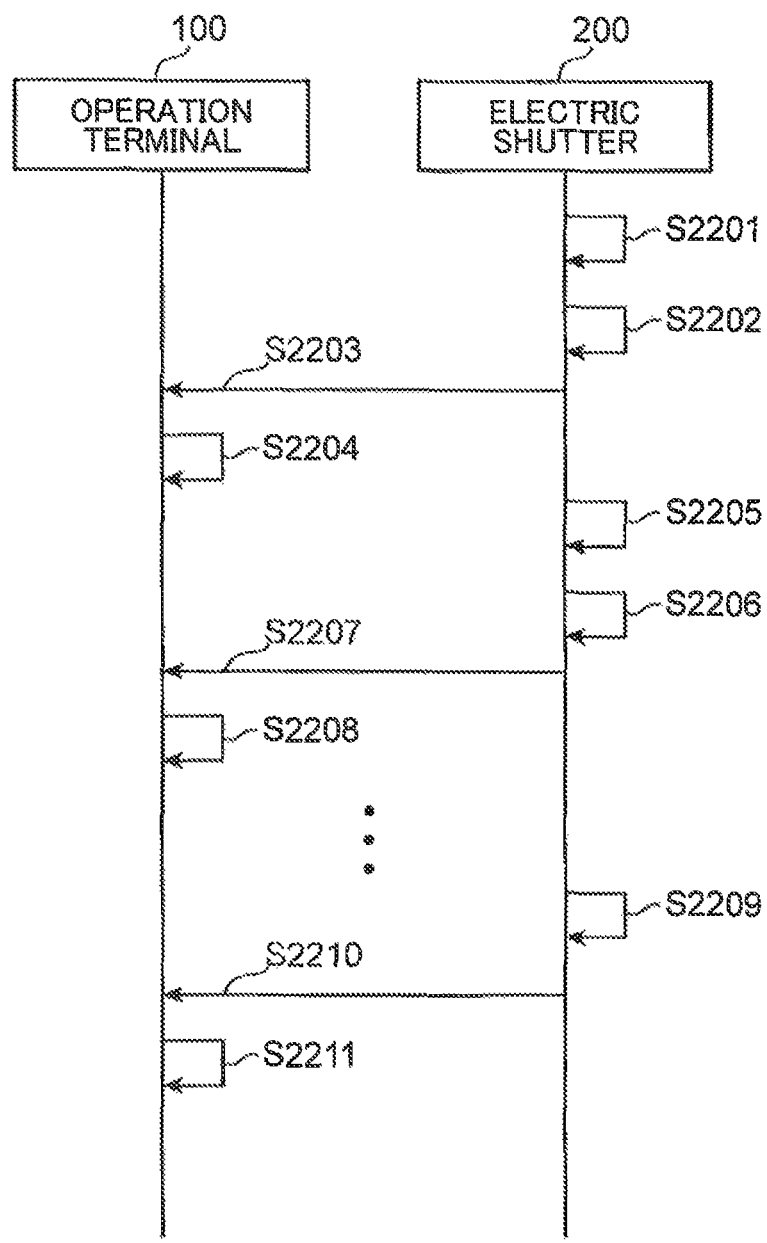

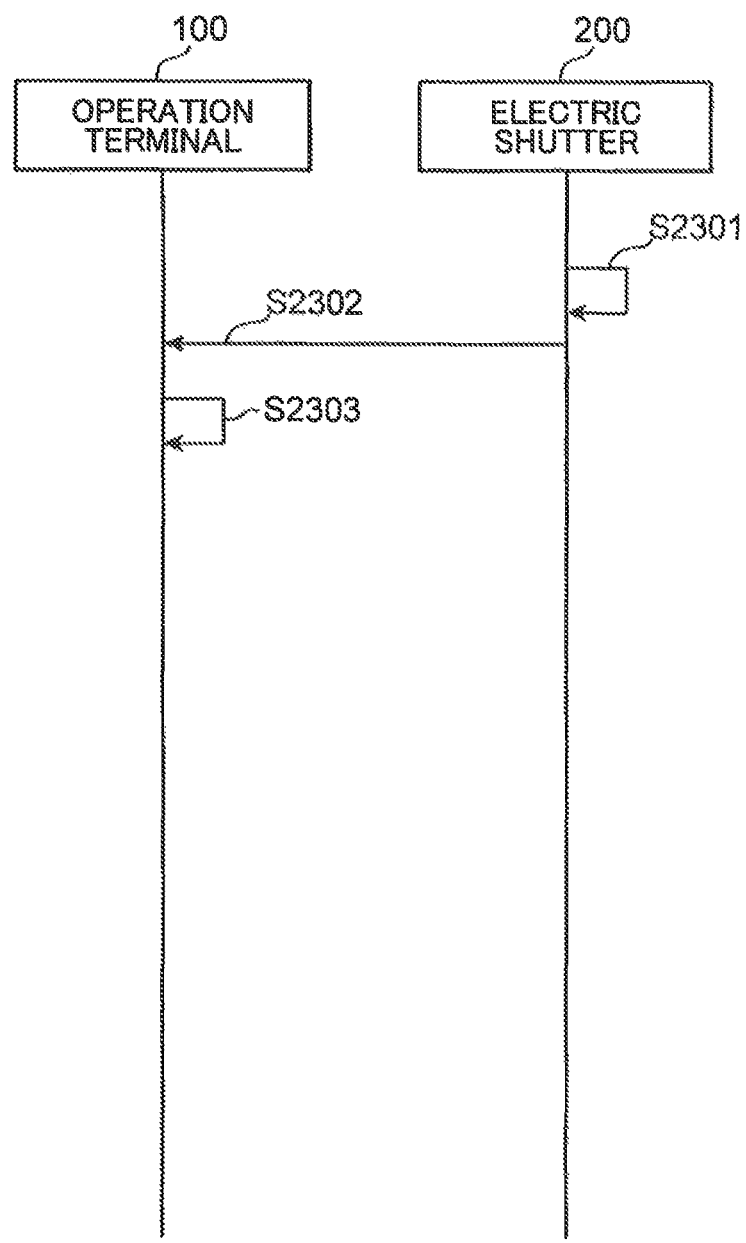

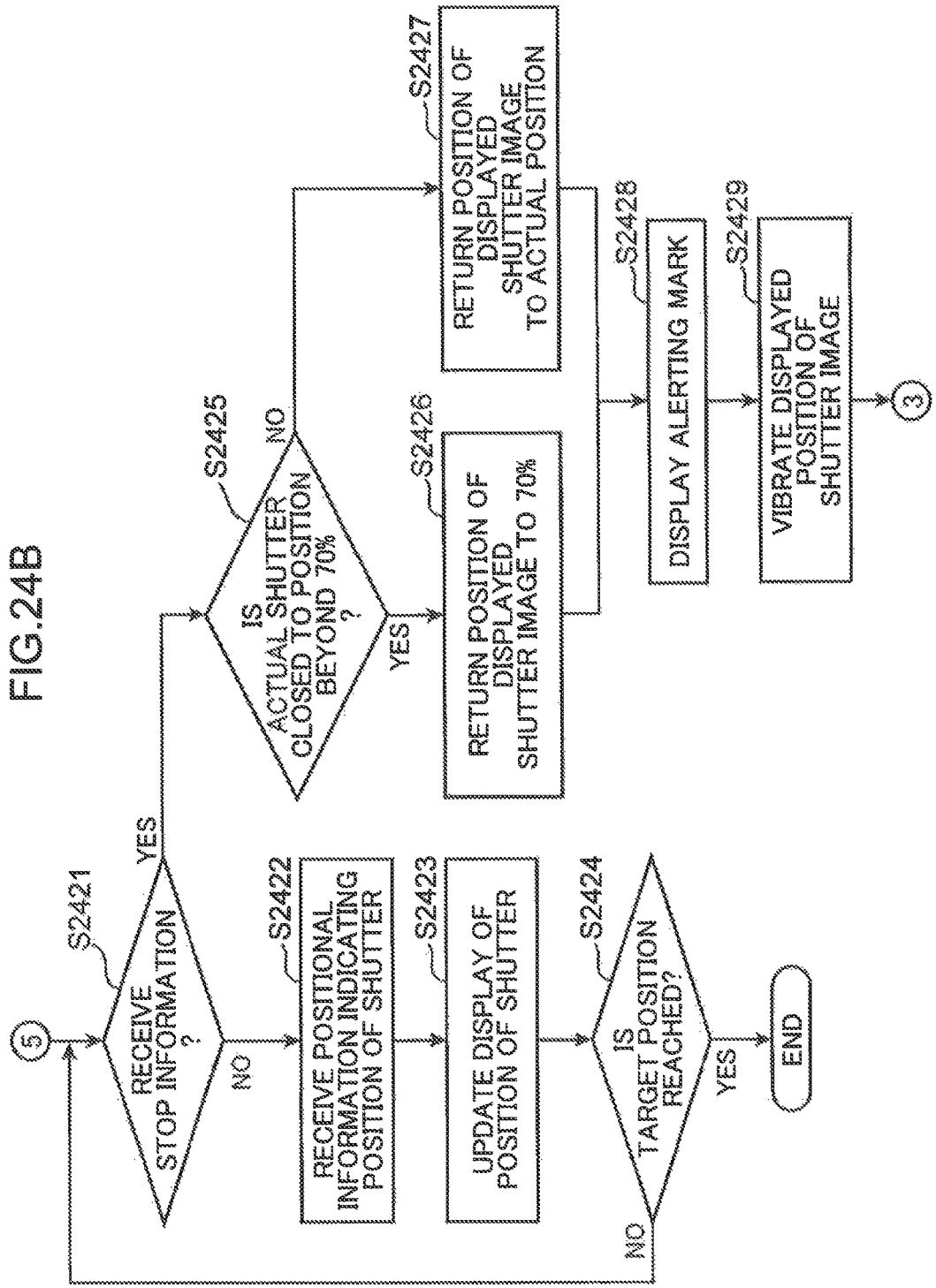

METHOD FOR CONTROLLING INFORMATION APPARATUS

This application is a continuation application of co-pending U.S. patent application Ser. No. 14/547,700, filed Nov. 19, 2014, which is a continuation application of international Application No. PCT/JP2014/000772, filed Feb. 14, 2014, which claims the benefit of U.S. Provisional application No. 61/766,843, filed Feb. 20, 2013, the disclosures of which are incorporated by reference herein in their entireties.

The present disclosure relates to a method for controlling an information apparatus.

TECHNICAL FIELD

Background Art

A variety of proposals have been made for open/close control for a shutter of an electric shutter device.

For example, Patent Document 1 discloses a technology for operating an open/close element of an architectural electric open/close device using a remote operation device. Specifically, a remote operation unit 7 has operation switches PBU, PBD, and PBS for opening, closing, and stopping. The remote operation unit 7 outputs an operation signal in which a device code that specifies a shutter device 1 as a control target and a data code that specifies operation (opening, closing, and stopping) of a shutter curtain are formed by one word (paragraphs [0009] and [0024]). In the case where an input operation signal is an open/close operation signal, a receiving section 9 of an operation unit 8 enables open/close operation of a shutter curtain 2 when a predetermined number of words of the operation signal are input continuously. In the case where the input operation signal is a stop operation signal, on the other hand, the receiving section 9 stops open/close operation of the shutter curtain 2 when one word of the operation signal is input (paragraph [0025]).

However, Patent Documents 1 described above needs a further improvement.

Patent Document 1: Japanese Patent Application Laid-open No. 2011-94408 (for example, paragraphs [0009], [0024], [0025] and the like)

SUMMARY OF THE INVENTION

In one general aspect, the techniques disclosed here feature a method for controlling an information apparatus, the information apparatus having a touch panel display and being connected to a network, an electric shutter device being controlled over the network, the electric shutter device being capable of opening and closing a shutter through a remote operation, the method causing a computer of the information apparatus to:

display an operation icon on a display screen of the information apparatus, the operation icon causing an operation screen for the electric shutter device to be displayed;

display the operation screen for the electric shutter device when selection of the operation icon is sensed, the operation screen including a shutter image representing the shutter of the electric shutter device; and when a swipe operation is sensed on the operation screen, output to the network a movement control command for moving the shutter of the electric shutter device in a swipe direction of the swipe operation.

According to the aspect described above, it is possible to embody a further improvement. These general and specific aspects may be implemented using a system, a method, and a computer program, and any combination of systems, methods, and computer programs.

BRIEF DESCRIPTION OF THE DRAWINGS

FIG. 14 is a sequence diagram showing a process flow in the operation terminal and the electric shutter device.

FIG. 15 is a flowchart showing a process flow for the operation terminal to control the electric shutter device.

FIG. 17 is a flowchart showing a process flow in the electric shutter device.

FIG. 18 is a diagram showing a display example of the shutter control screen for a case where an obstacle is detected.

FIG. 19 is a diagram showing a display example of the shutter control screen that is different from FIG. 18 for a case where an obstacle is detected.

FIG. 20 is a sequence diagram showing a process flow in the operation terminal and the electric shutter device for a case where obstacle detection is taken into consideration.

FIG. 21 is a sequence diagram showing a process flow in the operation terminal and the electric shutter device for a case where obstacle detection is taken into consideration.

FIG. 22 is a sequence diagram showing a process flow in the operation terminal and the electric shutter device that is different from FIG. 21 for a case where obstacle detection is taken into consideration.

FIG. 23 is a sequence diagram showing a process flow in the operation terminal and the electric shutter device that is different from FIGS. 21 and 22 for a case where obstacle detection is taken into consideration.

FIG. 24B is a flowchart showing a process flow for the operation terminal to control the shutter of the electric shutter device for a case where an obstacle is taken into consideration.

DETAILED DESCRIPTION

Figure 1:
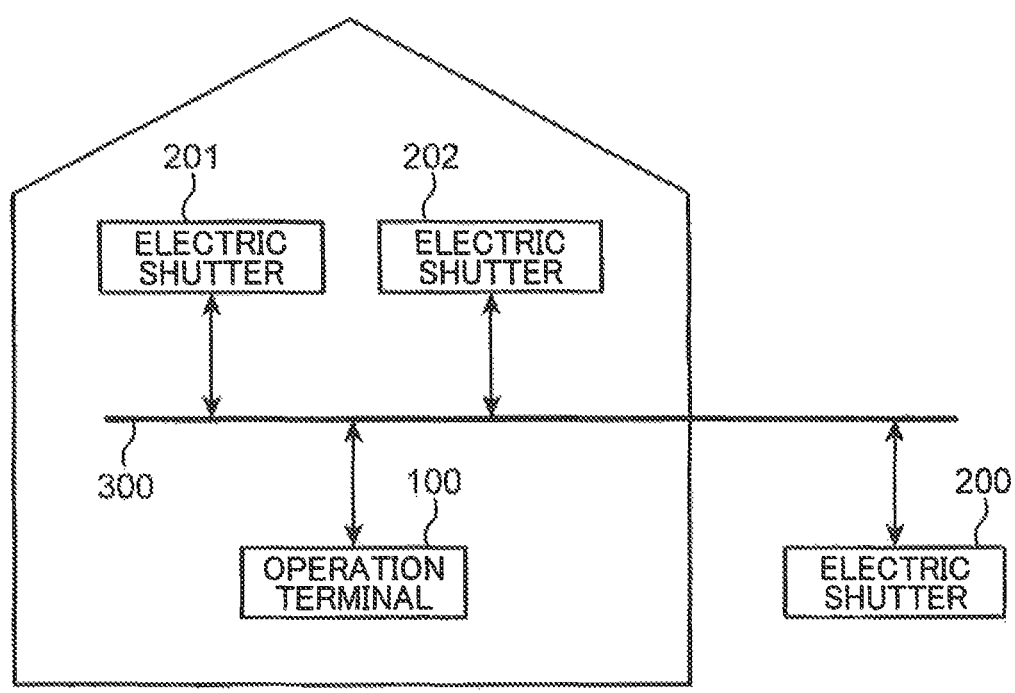
FIG. 1 is a diagram showing an overall configuration of a shutter control system according to an embodiment of the present disclosure.

Story Before Inventing Aspect According to Present Disclosure

First, the point of view of an aspect according to the present disclosure will be described.

In Patent Document 1 described above, the remote operation unit 7 has the operation switches PBU, PBD, and PBS for opening, closing, and stopping. That is, the shutter of the electric shutter device is opened and closed by a user by pressing the operation switches of the remote operation unit 7. Therefore, in Patent Document 1, the shutter of the electric shutter device is opened and closed through simple control in which an open operation signal, a close operation signal, or a stop operation signal is transmitted by depressing the open operation button, the close operation button, or the stop button.

Moreover, the remote operation unit 7 does not have a display section that displays the opening/closing condition of the shutter of the electric shutter device. Therefore, the operating condition of the shutter of the electric shutter device cannot be confirmed at the same time while operating to open, close, or stop the shutter of the electric shutter device. Thus, in the case where it is desired to open the shutter of the electric shutter device halfway and stop the shutter at a desired position, or in the case where it is desired to close the shutter halfway and stop the shutter at a desired position, for example, it is necessary to stay by the shutter of the electric shutter device and visually confirm the shutter position. That is, it cannot be remotely confirmed at what position the shutter of the electric shutter device is stopped.

In the case where the electric shutter device is provided at a window, for example, when sun rays are strong such as during summer, the shutter of the electric shutter device may be opened halfway to take sunlight into a room while blocking the sun rays with the shutter half open. In such a case, with the technology disclosed in Patent Document 1 described above, it is necessary to take the trouble to go near the electric shutter device for visual confirmation, and the shutter position cannot be appropriately controlled remotely.

In addition, the electric shutter device is different from devices of a type that is turned on and off to establish a desired state in that the electric shutter device involves open/close operation. For example, there is a case where the shutter of the electric shutter device is opened halfway and further opened or closed for adjustment while confirming the position of the opened shutter. In this case, taking the trouble to go near the electric shutter device for visual confirmation reduces the effect of a remote operation.

In addition, the size of the remote operation unit 7 is limited from the viewpoint of operability, and not necessarily satisfactory simply because the remote operation unit 7 can be provided with a display section. On the other hand, the remote operation unit 7 is unsuitable for a process of finely adjusting opening and closing of the shutter of the electric shutter device unless the display section has a more or less large display area.

Based on the considerations described above, the inventors have conceived various aspects of the present disclosure to be described below.

An aspect of the present disclosure is a method for controlling an information apparatus, the information apparatus having a touch panel display and being connected to a network, an electric shutter device being controlled over the network, the electric shutter device being capable of opening and closing a shutter through a remote operation, the method causing a computer of the information apparatus to:

display an operation icon on a display screen of the information apparatus, the operation icon causing an operation screen for the electric shutter device to be displayed;

display the operation screen for the electric shutter device when selection of the operation icon is sensed, the operation screen including a shutter image representing the shutter of the electric shutter device; and when a swipe operation is sensed on the operation screen, output to the network a movement control command for moving the shutter of the electric shutter device in a swipe direction of the swipe operation.

According to the aspect, when the operation screen for the electric shutter device is displayed, a shutter image representing the shutter of the electric shutter device appears on the operation screen. Then, when a swipe operation is sensed on the shutter image, for example, on the operation screen, control is performed. so as to move the shutter of the electric shutter device in a swipe direction of the swipe operation.

This enables remotely controlling the operation of the shutter of the electric shutter device which is not a device in which power is simply turned on and off.

Movement of the shutter of the electric shutter device is controlled through the swipe operation, for example. Therefore, the shutter of the electric shutter device may be not only opened completely but also opened halfway. For example, when sun rays are strong such as during summer, the shutter of the electric shutter device may be opened to an intermediate position to take sunlight into a room while blocking the sun rays with the shutter opened halfway. Also in this case, the shutter of the electric shutter device can be opened to an intermediate position.

For example, there is a case where the shutter of the electric shutter device is opened halfway and further opened or closed while confirming the opened state. Also in this case, the open-close state of the shutter of the electric shutter device can be confirmed on the operation screen while performing an operation of moving the shutter of the electric shutter device. That is, the operation screen also serves as a confirmation screen for confirmation as to what position the shutter is opened to in accordance with an instruction given by the user by performing an operation of the operation screen. Thus, the operation instruction screen and the moving state confirmation screen are common to each other. Therefore, it is possible to effectively process an operation of moving the shutter of the electric shutter device and to make the most of the display area of the operation screen.

Further, as described above, the operation screen also serves as display for confirmation of the open/close state of the shutter. Thus, the operation screen can be used not only to stop the shutter of the electric shutter device in the middle of being opened and closed, but also to confirm that an instruction to stop the shutter at a desired position has been given at the same time. As a result, for example, opening and closing of the shutter of the electric shutter device can be stopped without the shutter moving past the desired position. In addition, for example, the open/close position of the shutter of the electric shutter device can be finely adjusted.

In the aspect described above, for example, a distance control command may be output to the network as the movement control command when the swipe operation is sensed on the operation screen, the distance control command causing the shutter of the electric shutter device to move in the swipe direction a distance in accordance with an amount of movement in the swipe direction of the swipe operation.

Consequently, movement of the shutter of the electric shutter device is controlled through the swipe operation. Therefore, the shutter of the electric shutter device may be not only opened completely but also opened halfway.

In the aspect described above, for example, movement of the shutter of the electric shutter device may comprise movement to open the shutter of the electric shutter device or movement to close the shutter of the electric shutter device.

In the aspect described above, for example, the electric shutter device may have the shutter which opens or closes in one direction.

In the aspect described above, for example, when the swipe operation is sensed on the operation screen, the shutter represented in the shutter image may be moved in accordance with a swipe amount in the swipe direction of the swipe operation.

This allows an operation of moving the shutter of the electric, shutter device and confirmation of the moving state of the shutter of the electric shutter device to be performed on the operation screen for the electric shutter device in accordance with the shutter image representing the shutter of the electric shutter device. Thus, the operation screen for the electric shutter device and the confirmation screen for the electric shutter device are integral with each other. Therefore, the open/close state of the electric shutter device can be confirmed by making the most of the size of the operation screen.

In the aspect described above, for example, the shutter image may comprise an image representing the shutter of the electric shutter device used as a storm sash provided at a window, and in a case where the shutter represented in the shutter image is moved in an opening direction, a window image representing the window which has been hidden behind the shutter of the electric shutter device may be displayed in a region corresponding to the shutter image.

For example, in the case where the shutter of the electric shutter device is used for a plurality of purposes, it may not be discriminated what purpose the shutter of the electric shutter device as the operation target is used for, and a shutter of an electric shutter device that is different from the shutter of the intended electric shutter device may be erroneously operated. For example, the shutter of the electric shutter device used as a storm sash provided at a window, for example, may be erroneously opened when it is intended to open the shutter of the electric shutter device used as a gate provided in a garage.

According to the aspect, in a case where the shutter represented in the shutter image is moved in an opening direction, a window image representing the window which has been hidden behind the shutter of the electric shutter device is displayed. Therefore, an erroneous operation can be known through the same screen as the operation screen in the case where the moving state of the shutter of the electric shutter device is confirmed through the operation screen. As a result, it is possible to easily prevent an erroneous operation even in the case where the moving state of the shutter of the electric shutter device is confirmed through the operation screen rather than being confirmed with the shutter of the electric shutter device as a real object.

In the aspect described above, for example, in a case where the shutter represented in the shutter image is moved in a closing direction, the window image may be hidden behind the shutter represented in the shutter image.

In the aspect described above, for example, the shutter image may comprise an image representing the shutter of the electric shutter device used as a gate provided in a garage, and in a case where the shutter represented in the shutter image is moved in an opening direction, a vehicle image representing a vehicle in the garage which has been hidden behind the shutter of the electric shutter device may be displayed in a region corresponding to the shutter image.

For example, in a case where the shutter of the electric shutter device is used for a plurality of purposes, it may not be discriminated what purpose the shutter of the electric shutter device as the operation target is used for, and the shutter of an electric shutter device that is different from the shutter of the intended electric shutter device may be erroneously operated. For example, the shutter of the electric shutter device used as a gate provided in a garage, for example, may be erroneously opened when it is intended to operate to open the shutter of the electric shutter device used as a storm sash provided at a window.

According to the aspect, in a case where the shutter represented in the shutter image is moved in an opening direction, a vehicle image representing a vehicle in the garage which has been hidden behind the shatter of the electric shutter device is displayed. Therefore, an erroneous operation can be known through the same screen as the operation screen in the case where the moving state of the shutter of the electric shutter device is confirmed through the operation screen. As a result, it is possible to easily prevent an erroneous operation even in the case where the moving state of the shutter of the electric shutter device is confirmed through the operation screen rather than being confirmed with the shutter of the electric shutter device as a real object.

In the aspect described above, for example, in a case where the shutter represented in the shutter image is moved in a closing direction, the vehicle image may be hidden behind the shutter in the shutter image.

In the aspect described above, for example, positional information indicating a position of the shutter of the electric shutter device may be received via the network, and state information representing a position of an end portion of the shutter of the electric shutter device may be displayed in a region corresponding to the shutter image in accordance with the received positional information.

According to the aspect, state information representing the position of the end portion of the shutter of the electric shutter device is displayed in a region corresponding to the shutter image representing the shutter of the electric shutter device besides an image representing to what location the shutter of the electric shutter device is moved by an operation of the operation screen.

For example, there may be a case where a gap is present between the shutter image representing the shutter of the electric shutter device in the operation screen and the actual position to which the shutter of the electric shutter device has been moved. Also in such a case, the user is allowed to recognize the presence of the gap by confirming the state information representing the position of the end portion of the shutter of the electric shutter device.

Therefore, for example, a gap is present between the moving speed of the shutter in the shutter image on the operation screen and the actual moving speed of the shutter of the electric shutter device. Therefore, it may be erroneously recognized that the shutter of the electric shutter device is closed even if the shutter of the electric shutter device is actually not closed yet. Such an erroneous recognition can be prevented just by confirming display on the operation screen.

As a result, the operation screen functions not only to represent to what location the shutter of the electric shutter device is moved by an operation of the operation screen, but also as a confirmation screen for confirming the actual position to which the shutter of the electric shutter device has been moved. Thus, the actual position to which the shutter of the electric shutter device has been moved can be confirmed using the operation screen without confirming the actual shutter of the electric shutter device.

In the aspect described above, for example, the state information representing the position of the end portion of the shutter of the electric shutter device may be displayed as overlapped on the shutter image.

According to the aspect, the state information representing the position of the end portion of the shutter of the electric shutter device is displayed as overlapped on the shutter image representing the shutter of the electric shutter device. This allows the user to confirm the position of the end portion of the shutter of the electric shutter device with the user's eyes keeping on confirming the shutter image representing the shutter of the electric shutter device. Therefore, the actual position of the end portion of the shutter of the electric shutter device can be confirmed while performing an operation on the operation screen at the same time as the operation.

For example, there may be a case where a gap is present between the shutter image representing the shutter of the electric shutter device in the operation screen and the actual position to which the shutter of the electric shutter device has been moved. Also in such a case, it is possible to prevent an erroneous recognition that the shutter of the electric shutter device is closed even if the shutter of the electric shutter device is actually not closed yet because of failing to confirm the actual position of the end portion of the shutter of the electric shutter device.

In the aspect described above, for example, the state information representing the position of the end portion of the shutter of the electric shutter device may include a schematic shutter movement image representing the position of the end portion of the shutter of the electric shutter device.

According to the aspect, a schematic shutter movement image representing the position of the end portion of the shutter of the electric shutter device is displayed as overlapped on the shutter image representing the shutter of the electric shutter device. This allows the user to recognize a gap, if any, that is present between the shutter image representing the shutter of the electric shutter device in the operation screen and the actual position of the end portion of the shutter of the electric shutter device, for example, at a glance. Therefore, the operation screen can be used not only to perform the operation but also to confirm the operation instruction and confirm the actual position of the shutter of the electric shutter device on the same screen.

In the aspect described above, for example, the schematic shutter movement image may be displayed in a color that is different from a color in which the shutter in the shutter image is displayed.

In the aspect described above, for example, the electric shutter device may have a sensor which senses an obstacle ahead of an end portion of the shutter which moves, and a mechanism which stops movement of the shutter in a case where the obstacle is sensed ahead of the end portion of the shutter which moves, and the method for controlling the information apparatus may cause the computer of the information apparatus to:

in a case where stop information, which indicates that movement of the shutter of the electric shutter device has been stopped before the shutter reaches a closed position, is received via the network, and in a case where the shutter represented in the shutter image is varied into a closed state, return the shutter represented in the shutter image in a second direction opposite to a first direction which is a moving direction of the shutter represented in the shutter image.

For example, there may be a case where movement of the actual shutter of the electric shutter device is stopped because of sensing of an obstacle or the like, even in the case where an image in which the shutter represented in the shutter image is closed is displayed on the operation screen. In this case, a gap is present between the state indicated by the image displayed on the operation screen and the actual state of the shutter of the electric shutter device.

In this way, there may be a case where movement of the shutter of the electric shutter device is stopped before the actual shutter reaches the closed position, even in the case where the image on the operation screen has been varied into an image in which the shutter represented in the shutter image is closed. In such a case, according to the aspect, the shutter represented in the shutter image is returned in a second direction that is opposite to a first direction which is a moving direction of the shutter represented in the shutter image.

This causes the image on the operation screen to return to an image reflecting the actual state of the shutter of the electric shutter device even if an image in which the shutter represented in the shutter image is closed is temporarily displayed on the operation screen in accordance with an operation of the operation screen. Therefore, the gap that is present between the state indicated by the image displayed on the operation screen and the actual state of the shutter of the electric shutter device can be eliminated. In addition, the user can be informed of the actual state of the shutter of the electric shutter device by confirming the operation screen. As a result, it is possible to prevent an erroneous recognition of the actual state of the shutter of the electric shutter device just by confirming the operation screen without taking the trouble to confirm the actual shutter of the electric shutter device.

In the aspect described above, for example, the shutter represented in the shutter image may be returned in the second direction by a first predetermined amount corresponding to a stop position of the shutter of the electric shutter device, indicated by the stop information.

Examples of the sensor that senses presence of an obstacle ahead of an end portion of the shutter, which is moving, of the electric shutter device include a contact sensor and an optical sensor. In the case where the contact sensor is used, the shutter is not advanced any further when the moving shutter contacts an obstacle, and presence of the obstacle is judged.

Meanwhile, the optical sensor is attached at a predetermined position on a moving path of the shutter in the electric shutter device. Therefore, in the case where the optical sensor is used, movement of the shutter is stopped if the optical sensor senses presence of an obstacle at the predetermined position before the shutter contacts the obstacle. If an obstacle is present at the predetermined position before movement of the shutter is started, moving operation of the shutter is not performed. In the case where an obstacle is sensed at the predetermined position while the shutter is moving, movement of the shutter is stopped.

According to the aspect, the shutter represented in the shutter image may be returned in the second direction by a first predetermined amount corresponding to a stop position of the shutter of the electric shutter device, indicated by the stop information.

In the case where the contact sensor is used, for example, when the shutter starts moving and contacts an obstacle while moving, the shutter is stopped at the position of contact. In this case, the shutter represented in the shutter image is returned to a display position corresponding to the actual position at which the shutter is stopped.

In the case where the optical sensor is used, for example, movement of the actual shutter of the electric shutter device is not started if an obstacle is present at the predetermined position before the shutter starts moving. Thus, the shutter represented in the shutter image is returned to the open state of the shutter.

In the case where the optical sensor is used, for example, in the case where an obstacle is sensed at the predetermined position while the shutter is moving, the shutter is stopped while moving. In this case, the shutter represented in the shutter image is returned to a display position corresponding to the actual position at which the shutter of the electric shutter device is stopped.

In the aspect described above, for example, in a case where the shutter represented in the shutter image is returned in the second direction by the first predetermined amount, the end portion of the shutter represented in the shutter image may be repeatedly moved alternately in the first direction and the second direction.

According to the aspect, in a case where the shutter represented in the shutter image is returned, the end portion of the shutter represented in the shutter image is repeatedly moved alternately in the first direction and the second direction. This allows distinction on display from a case where the shutter of the electric shutter device is closed to the position by an operation performed by the user using the operation screen. There is a case where movement of the actual shutter of the electric shutter device is stopped because of sensing of an obstacle or the like. In such a case, the user can be easily alerted just by the display without using other dedicated means for warning the user of the stoppage while avoiding confusion with a case where the shutter is closed to the position by an operation performed by the user.

In the aspect described above, for example, in a case where the stop information indicates that the shutter of the electric shutter device is closed beyond a predetermined reference amount, the shutter represented in the shutter image may be returned in the second direction by a second predetermined amount.

The shutter image representing the shutter of the electric shutter device displayed on the operation screen is smaller than the actual shutter of the electric shutter device. In the case where the actual shutter is stopped at a position at which the shutter is closed by about 90%, for example, it is conceivable to vary the shutter represented in the shutter image displayed on the operation screen into an image in which the shutter is closed by about 90%.

In this case, however, the user may not be able to definitely confirm whether the shutter image representing the shutter of the electric shutter device being displayed indicates a state in which the shutter is closed by 100% or a state in which the shutter is closed to about 90%, even if the user sees the operation screen, because the image is small. As a result, the user may see the operation screen and erroneously recognize that the actual shutter is fully closed even if the actual shutter is not fully closed because of an obstacle.

According to the aspect, in a case where the stop information indicates that the shutter of the electric shutter device is closed beyond a predetermined reference amount, for example, the shutter represented in the shutter image is returned in the second direction by a second predetermined amount.

This allows the shutter in the shutter image representing the shutter of the electric shutter device being displayed to be returned by the second predetermined amount to a state in which the shutter is closed by about 70% in the case where the actual shutter is stopped at a position at which the shutter is closed by about 90% which exceeds the predetermined reference amount, for example. Therefore, it can be definitely indicated that the actual shutter is stopped in the middle position, even in the case where the actual shutter is stopped at a position at which the shutter is closed by about 90%, by returning the shutter represented in the shutter image. As a result, the user can be prevented, by simple means, from erroneously recognizing that the actual shutter is fully closed by seeing the operation screen even if the actual shutter is not fully closed because of an obstacle.

In the aspect described above, for example, in a case where the shutter represented in the shutter image is returned in the second direction by the second predetermined amount, the end portion of the shutter represented in the shutter image may be repeatedly moved alternately in the first direction and the second direction.

According to the aspect, in a case where the shutter represented in the shutter image is returned, the end portion of the shutter represented in the shutter image is repeatedly moved alternately in the first direction and the second direction. This allows distinction on display from a case where the shutter of the electric shutter device is closed to the position by an operation performed by the user using the operation screen. There is a case where movement of the actual shutter of the electric shutter device is stopped because of sensing of an obstacle or the like. In such a case, the user can be easily alerted just by the display without using other dedicated means for warning the user of the stoppage while avoiding confusion with a case where the shutter is closed to the position by an operation performed by the user.

EMBODIMENT

An embodiment of the present disclosure will be described below with reference to the drawings. In the drawings, the same symbols are used for the same constituent elements.

In the embodiment, an operation terminal which can remotely control shutter will be described.

FIG. 1 is a diagram showing an overall configuration of a shutter control system according to the embodiment. As shown in FIG. 1, the shutter control system includes an operation terminal 100, and electric shutter devices 200, 201, and 202.

The electric shutter device 200 is disposed outside of a house. The operation terminal 100 and the electric shutter devices 201 and 202 are disposed inside the house. The operation terminal 100 and the electric shutter devices 200, 201, and 202 communicate with each other via a wired or wireless network 300. For example, the electric shutter devices 200, 201, and 202 and the operation terminal 100 are communicably connected to each other via the wireless or wired in-home network 300. The network 300 may be an external network such as the Internet.

The operation terminal 100 is not necessarily disposed in the house, and may be disposed outside the house. In this case, a user controls the electric shutter devices 200, 201, and 202 from a location away from the home.

An information terminal such as a smartphone or a tablet terminal may be adopted as the operation terminal 100. It should be noted, however, that the smartphone and the tablet terminal are merely exemplary, and an information terminal of a button type such as a cellular phone may be adopted as the operation terminal 100.

In the embodiment, as shown in FIG. 1, three electric shutter devices 200, 201, and 202 are provided. However, this is exemplary. Alternatively, one, two, or four or more electric shutter devices may be provided.

Figure 2:
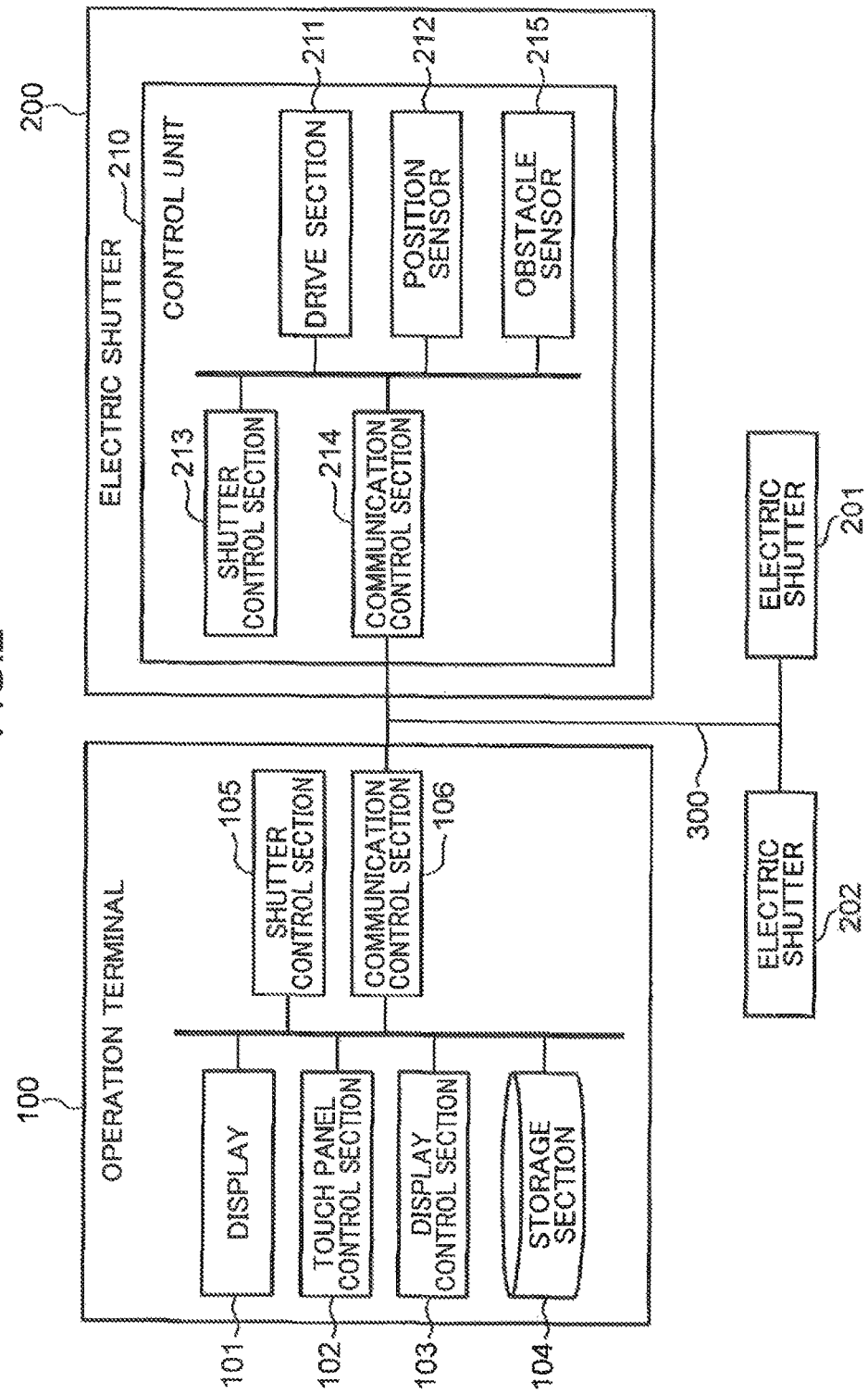
FIG. 2 is a block diagram showing an electrical configuration of an operation terminal and an electric shutter device according to an embodiment of the present disclosure.
Figure 3:
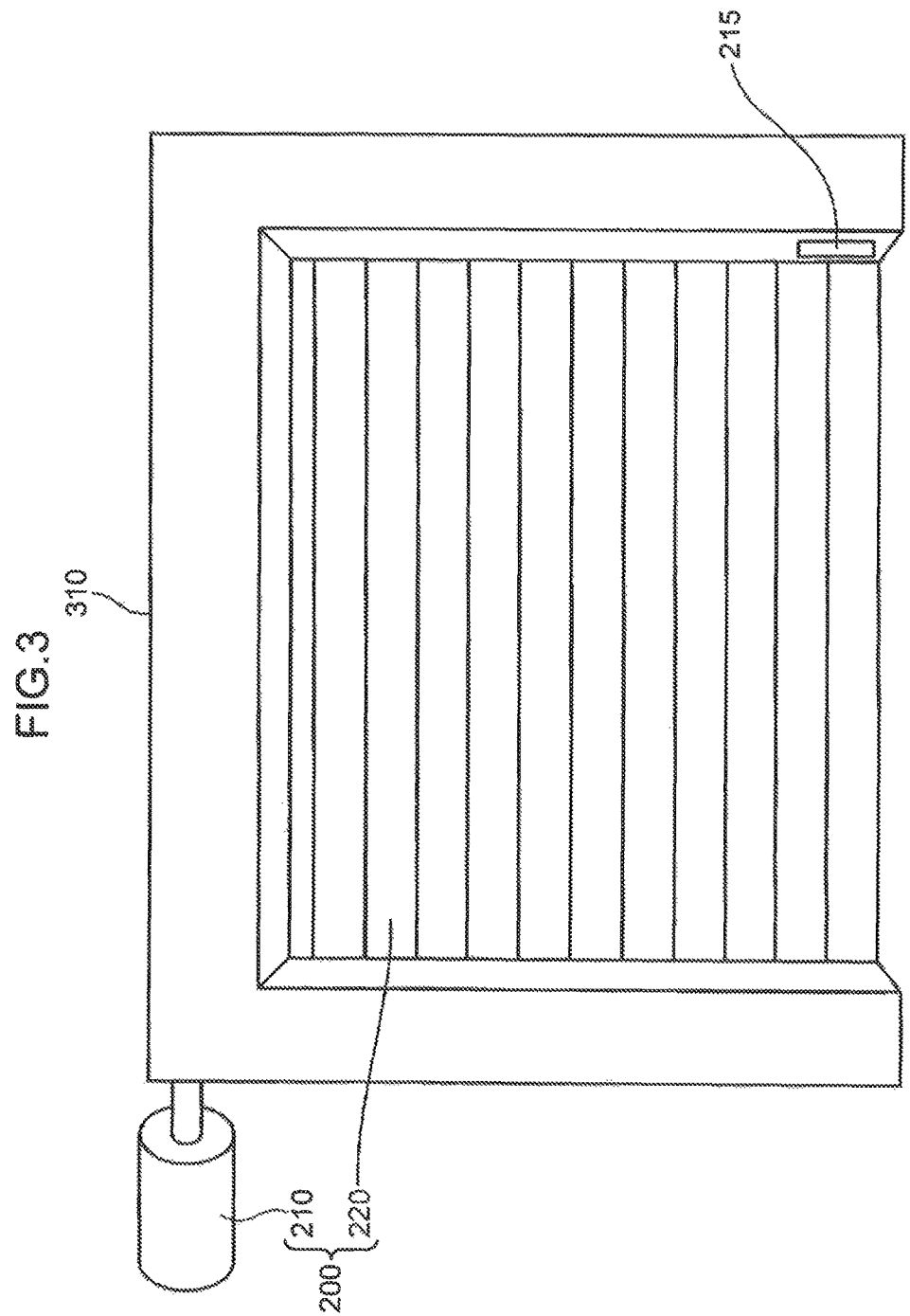
FIG. 3 is a diagram schematically showing an example of a configuration of an electric shutter device according to an embodiment of the present disclosure.
Figure 4:
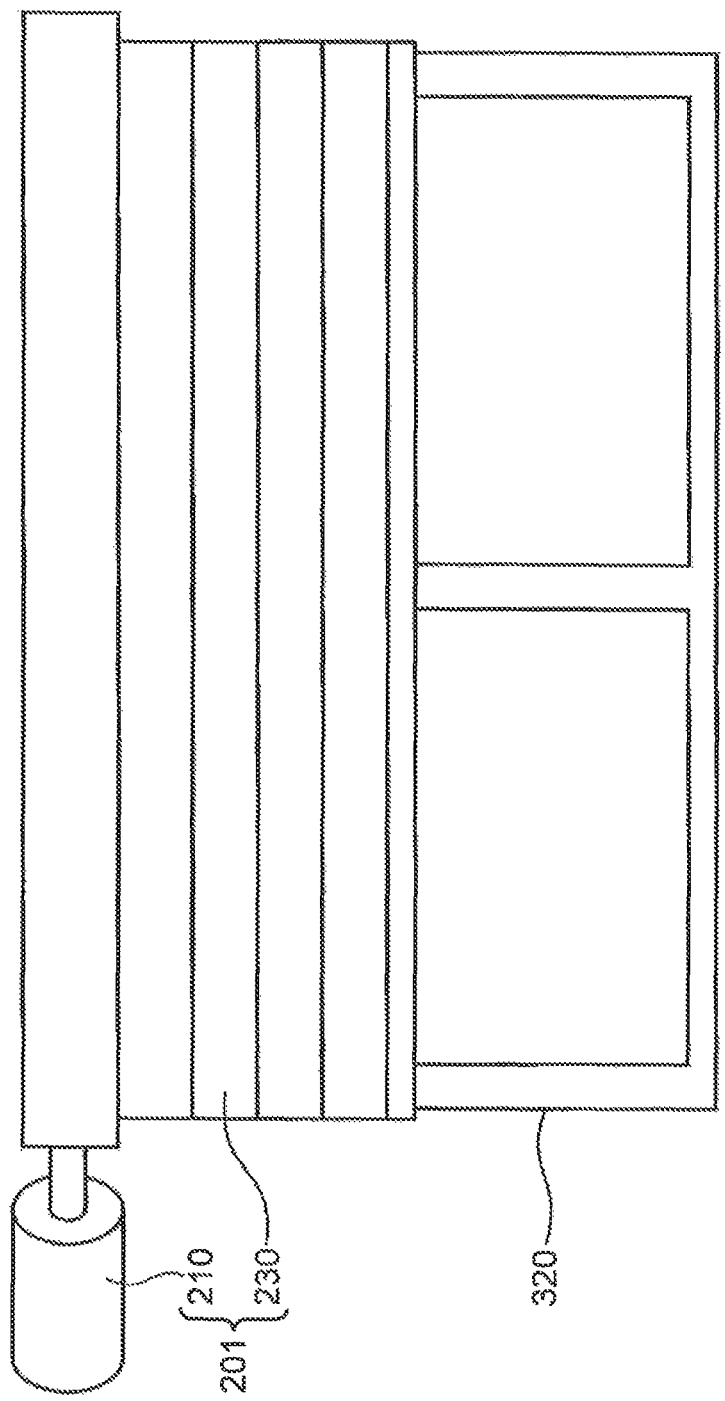
FIG. 4 is a diagram schematically showing another example of a configuration of an electric shutter device according to an embodiment of the present disclosure.

FIG. 2 is a block diagram showing the electrical configuration of the operation terminal 100 and the electric shutter devices 200, 201, and 202. FIG. 3 is a diagram schematically showing an example of a configuration of the electric shutter device 200. FIG. 4 is a diagram schematically showing an example of a configuration of the electric shutter device 201. As shown in FIG. 2, the operation terminal 100 includes a display 101, a touch panel control section 102, a display control section 103, a storage section 104, a shutter control section 105, and a communication control section 106.

The display 101 is formed from a touch panel display, for example, and displays a user interface that allows the user to operate the operation terminal 100. The user can input various operations to the operation terminal 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 judges that the object is selected by the user. A variety of GUI (Graphical User interface) parts that receive a user operation such as buttons are adopted as the object.

The display control section 103 generates a GUI of the operation terminal 100, and causes the display 101 to display the GUI. The storage section 104 stores information that is necessary for operation of the operation terminal 100 such as the type and the arrangement of the shutter which is the operation target.

The shutter control section 105 generates a control command for each of the electric shutter devices 200, 201, and 202. The communication control section 106 controls communication between the operation terminal 100 and the electric shutter devices 200, 201, and 202. In addition, the communication control section 106 receives a request to transmit a variety of data from other blocks such as the shutter control section 105, and transmits the received data to the electric shutter devices 200, 201, and 202. Further, the communication control section 106 receives data transmitted from the electric shutter devices 200, 201, and 202, and delivers the received data to relevant blocks such as the shutter control section 105.

The display 101 may be a normal display rather than a touch panel display. In this case, the user may use an external input device such as a mouse (not shown) to input an instruction to select an object by moving a pointer displayed on the display 101 and clicking on a desired object. That is in the embodiment, a series of operations performed by the user by contacting the display 101 may be replaced with operations of moving a pointer and clicking using an external input device such as a mouse.

As shown in FIG. 3, the electric shutter device 200 is provided in a garage 310. The electric shutter device 200 includes a control unit 210, a shutter 220 used as a gate to the garage 310, and so forth. The electric shutter device 200 is a device that enables the shutter 220 to be electrically opened and closed through a remote operation. As shown in FIG. 4, the electric shutter device 201 is provided at a window 320. The electric shutter device 201 includes a. control unit 210, a shutter 230 used as a storm sash, and so forth. The electric shutter device 201 is a device that enables the shutter 230 to be electrically opened and closed through a remote operation.

As shown in FIG. 2, the control unit 210 includes a drive section 211, a position sensor 212, a shutter control section 213, a communication control section 214, and an obstacle sensor 215. The drive section 211 includes a motor capable of rotating in forward and reverse directions, for example, to open and close the shutter 220.

The position sensor 212 detects the open/close state (position) of the shutter 220. The position sensor 212 specifically detects the position of an end portion of the shutter 220, for example, as the open/close state of the shutter 220. The position sensor 212 includes an encoder attached to a rotary shaft of the motor of the drive section 211, the rotary shaft being coupled to the shutter 220.

Alternatively, in the case where the drive section 211 includes a stepping motor, the position sensor 212 may count the number of steps of the stepping motor driven when opening and closing the shutter 220. The position sensor 212 may be any unit that can detect the open/close state of the shutter 220.

As shown in FIG. 3, the obstacle sensor 215 is provided on a right wall immediately outside the gate (shutter 220) of the garage 310, for example. A reflection plate is provided on a left wall immediately outside the gate (shutter 220) of the garage 310 at a position opposite to the obstacle sensor 215. The obstacle sensor 215 includes a light emitting section and a light receiving section, for example. The light receiving section of the obstacle sensor 215 receives light emitted from the light emitting section and reflected by the reflection plate. The obstacle sensor 215 is of an optical type, and thus can detect an obstacle when the obstacle appears, whether before the shutter 220 starts being closed or while the shutter 220 is being closed.

The shutter control section 213 controls opening and closing of the shutter 220 of the electric shutter device 200 in accordance with a control command transmitted from the operation terminal 100. In addition, the shutter control section 213 requests the communication control section 214 to transmit the result of execution of the control command, the open/close state of the shutter 220 of the electric shutter device 200, and so forth to the operation terminal 100.

The shutter control section 213 judges that an obstacle is interposed between the light emitting section and the reflection plate in the case where the light receiving section of the obstacle sensor 215 cannot receive the reflected light. If it is judged on the basis of the result of detection performed by the obstacle sensor 215 that there is an obstacle, the shutter control. section 213 controls the drive section 211 so as not to start operation to close the shutter 220 if the shutter 220 has not started being closed, and so as to stop operation to close the shutter 220 if the shutter 220 is being closed.

The communication control section 214 controls communication between the electric shutter device 200 and the operation terminal 100. In addition, the communication control section 214 receives a request to transmit a variety of data from the shutter control section 213, and transmits such data to the operation terminal 100. The communication control section 214 receives data transmitted from the operation terminal 100, and delivers the data to the shutter control section 213.

The light emitting section and the light receiving section of the obstacle sensor 215 may be disposed on the left and right walls immediately outside the gate (shutter 220) of the garage 310 so as to oppose each other. In this case, the reflection plate is not required. The shutter control section 213 judges that an obstacle is interposed between the light emitting section and the light receiving section in the case where the light receiving section of the obstacle sensor 215 cannot receive light from the light emitting section.

The obstacle sensor 215 is not limited to an optical type. Alternatively, the obstacle sensor 215 may be of a contact type. An obstacle sensor of a contact type detects a load applied to the drive section 211 which moves the shutter 220. The shutter control section 213 judges that there is an obstacle when an end portion of the shutter 220 moving in the closing direction contacts an obstacle and the load applied to the drive section 211 detected by the obstacle sensor of a contact type is increased. In the case where an obstacle sensor of a contact type is used, the shutter control section 213 can determine that there is an obstacle only after the shutter 220 starts moving in the closing direction and contacts an obstacle.

The electric shutter device 200 may include both an obstacle sensor of an optical type and an obstacle sensor of a contact type as the obstacle sensor 215. In addition, the obstacle sensor 215 may be a sensor of any other type that can detect an obstacle.

The electric shutter devices 201 and 202 are the same in electrical configuration as the electric shutter device 200 shown in FIG. 2. The electric shutter device 200 is provided in the garage 310, for example, as described above. The electric shutter device 201 is disposed in a living room, for example. The electric shutter device 202 is disposed in a Japanese room, for example.

Figure 5:
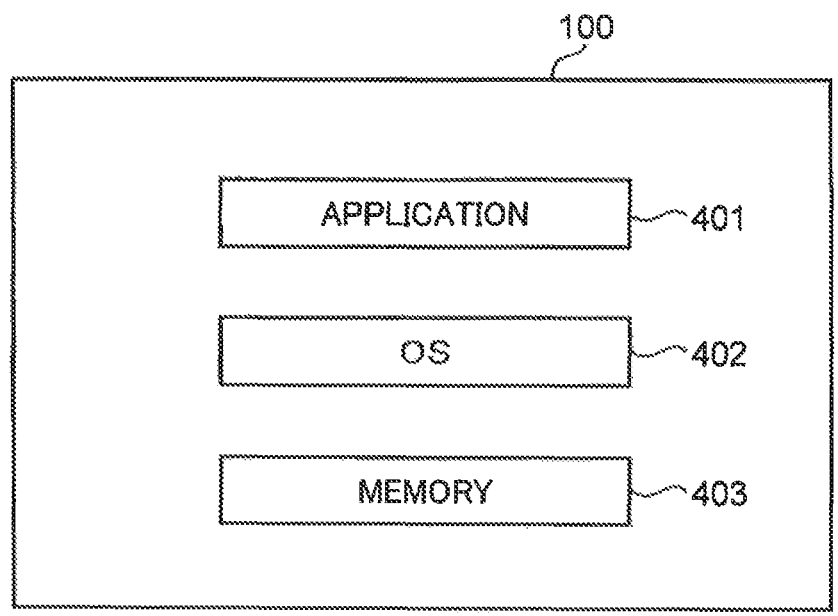
FIG. 5 is a diagram showing a configuration example of the form of implementation of the operation terminal according to an embodiment of the present disclosure.

FIG. 5 is a diagram showing a configuration example of the form of implementation of the operation terminal 100. As shown in FIG. 5, the operation terminal 100 includes an application 401, an OS (Operating System) 402, a memory 403, and other hardware (not shown).

The application 401 is application software for causing the information terminal to function as the operation terminal 100, and is executed by a processor of the operation terminal 100. The operation terminal 100 may read the application 401 from a computer readable recording medium to implement the application 401, or may download the application 401 from a network to implement the application 401. The OS 402 is basic software of the information terminal, and is executed by the processor of the operation terminal 100. The memory 403 is formed from a storage device such as a RAM and a ROM of the operation terminal 100, and stores a group of data included in the application 401. The processor of the operation terminal 100 executes the application 401 to embody the functions of the touch panel control section 102, the display control section 103, the storage section 104, the shutter control section 105, and the communication control section 106 shown in FIG. 2. In addition, the processor of the operation terminal 100 executes the application 401 to cause the memory 403 to function as the storage section 104.

It should be noted, however, that in the embodiment, the operation terminal 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any embodiment, the operation terminal 100 according to the embodiment can be embodied. In the embodiment, the processor and the storage device forming the information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 6:
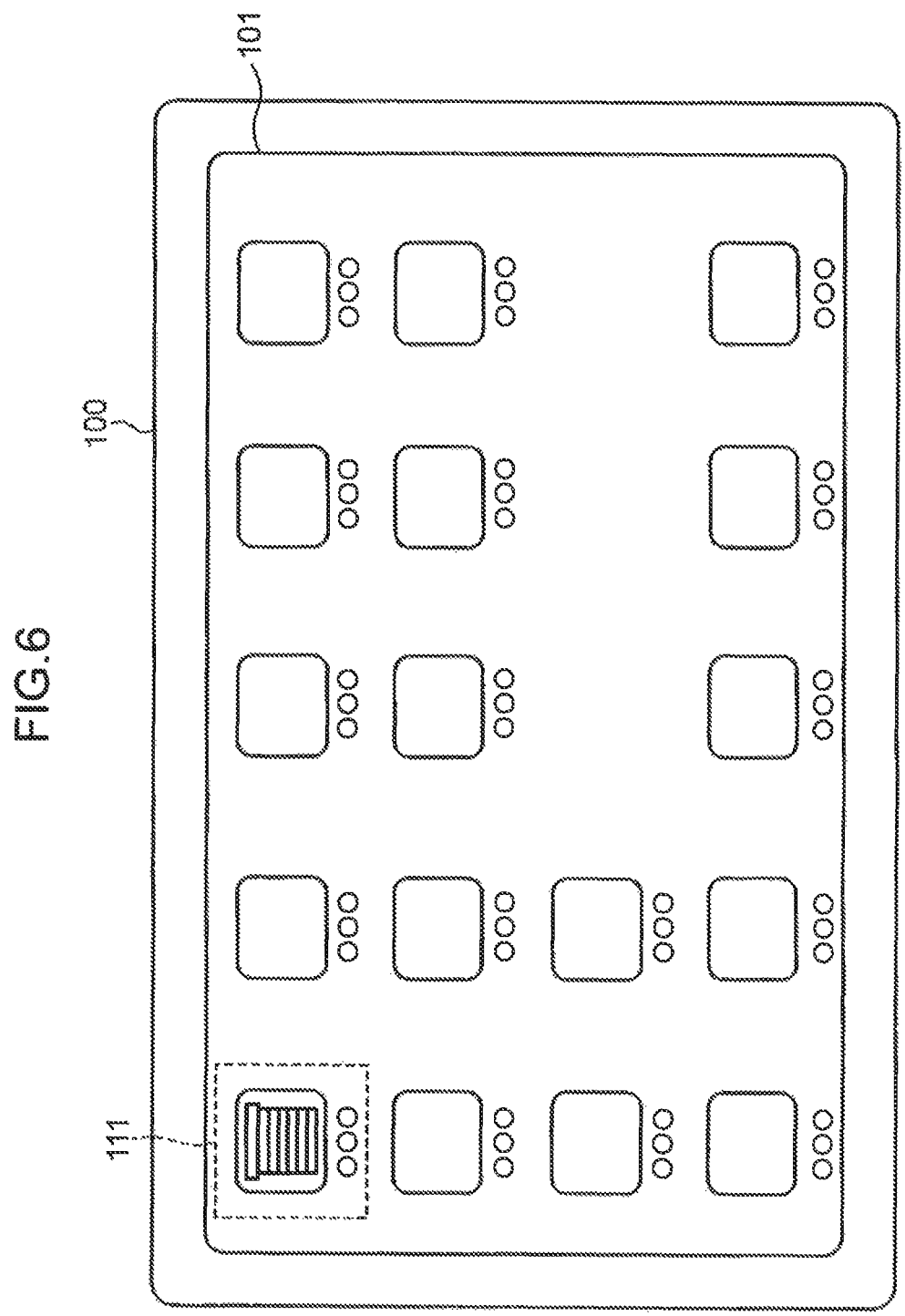
FIG. 6 is a diagram showing a display example of a menu screen displayed on a display for a case where a tablet is used as the operation terminal.
Figure 7:
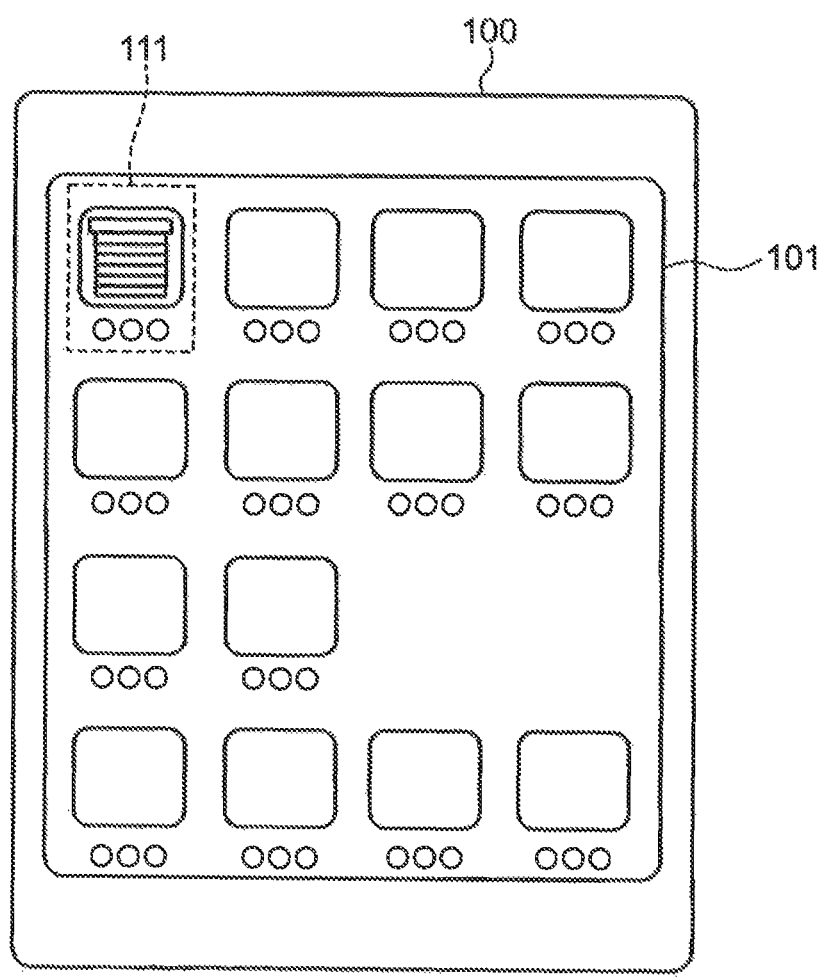
FIG. 7 is a diagram showing a display example of the menu screen displayed on the display for a case where a smartphone is used as the operation terminal.

FIG. 6 is a diagram showing a display example of a menu screen displayed on the display 101 for a case where a tablet is used as the operation terminal 100. FIG. 7 is a diagram showing a display example of a menu screen displayed on the display 101 for a case where a smartphone is used as the operation terminal 100. As shown in FIGS. 6 and 7, the menu screen displayed on the display 101 of the operation terminal 100 includes a shutter icon 111. The shutter icon 111 is an operation icon for starting the application 401 for electric shutter control. The shutter icon 111 includes an image schematically representing a shutter.

Figure 8:
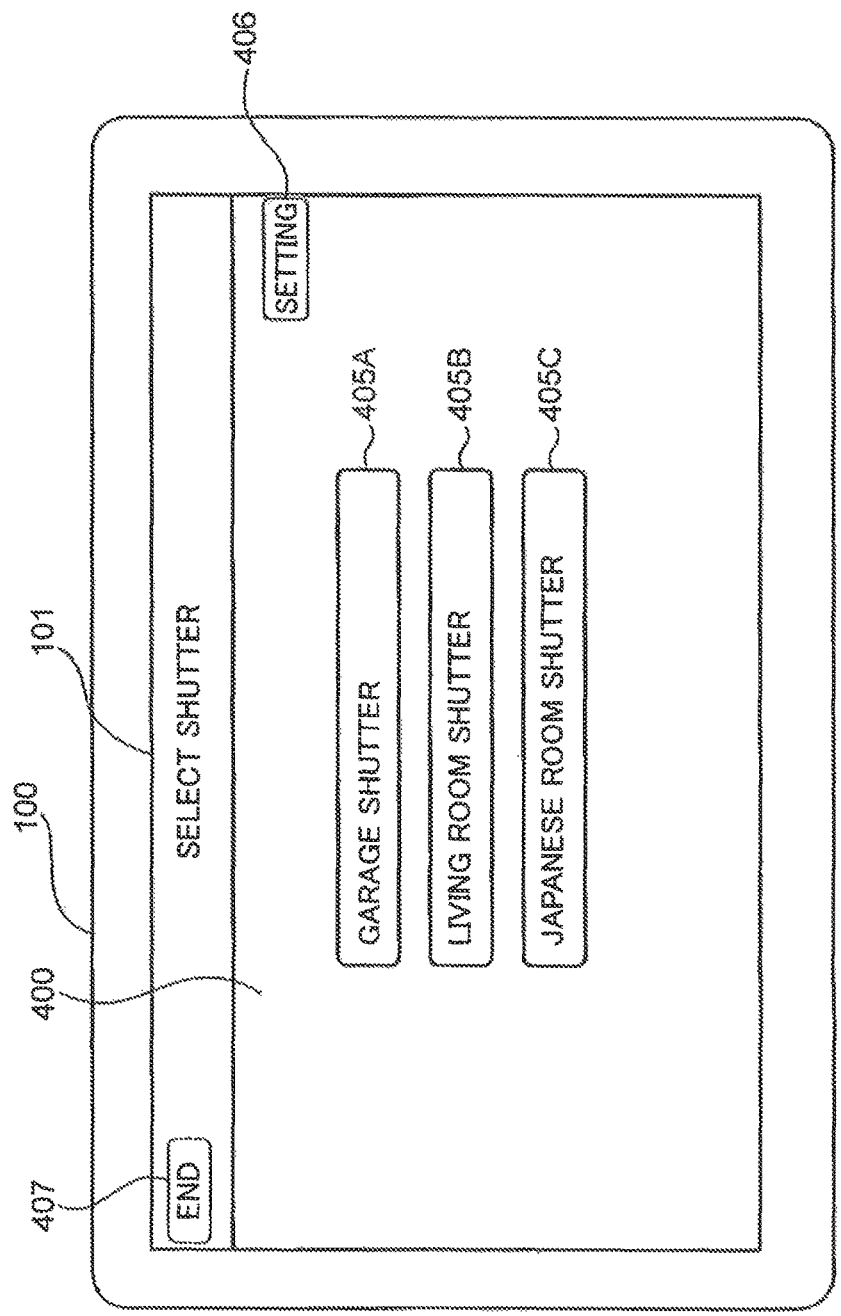
FIG. 8 is a diagram showing an example of a shutter select screen displayed on the display of the operation terminal.

FIG. 8 is a diagram showing an example of a shutter select screen 400 displayed on the display 101 of the operation terminal 100. When the user selects the shutter icon 111 with a contacting object (for example, one finger of the user) in the menu screen shown in FIG. 6 or 7, the touch panel control section 102 senses the selection. Then, the application 401 for electric shutter control is started, and the display control section 103 displays the shutter select screen 400 corresponding to the shutter icon 111 on the display 101 as shown in FIG. 8.

The shutter select screen 400 includes select buttons 405A, 405B, and 405C, a set button 406, and an end button 407. A text "SELECT SHUTTER" is affixed to the shutter select screen 400. The configuration allows the user to easily understand that the screen displayed on the display 101 is a screen for selecting an electric shutter device.

The select button 405A is an operation button for selecting the electric shutter device 200 in the garage 310. The select button 405B is an operation button for selecting the electric shutter device 201 in the living room. The select button 405C is an operation button for selecting the electric shutter device 202 in the Japanese room. The select buttons 405, 405B, and 405C are operation icons for displaying a shutter control screen for the electric shutter devices 200, 201, and 202, respectively.

The set button 406 is an operation button for making a variety of settings. The set button 406 is used to associate a select button and a shutter as the operation target with each other, for example. The set button 406 is used to set a name given to a select button, for example.

The end button 407 is an operation button for ending the application 401 for electric shutter control. When the user selects the end button 407 with a contacting object (for example, one finger of the user), the touch panel control section 102 senses the selection. Then, the application 401 for electric shutter control is ended, and the display control section 103 restores a state in which the menu screen is displayed on the display 101 as shown in FIG. 6 or 7.

Figure 9:
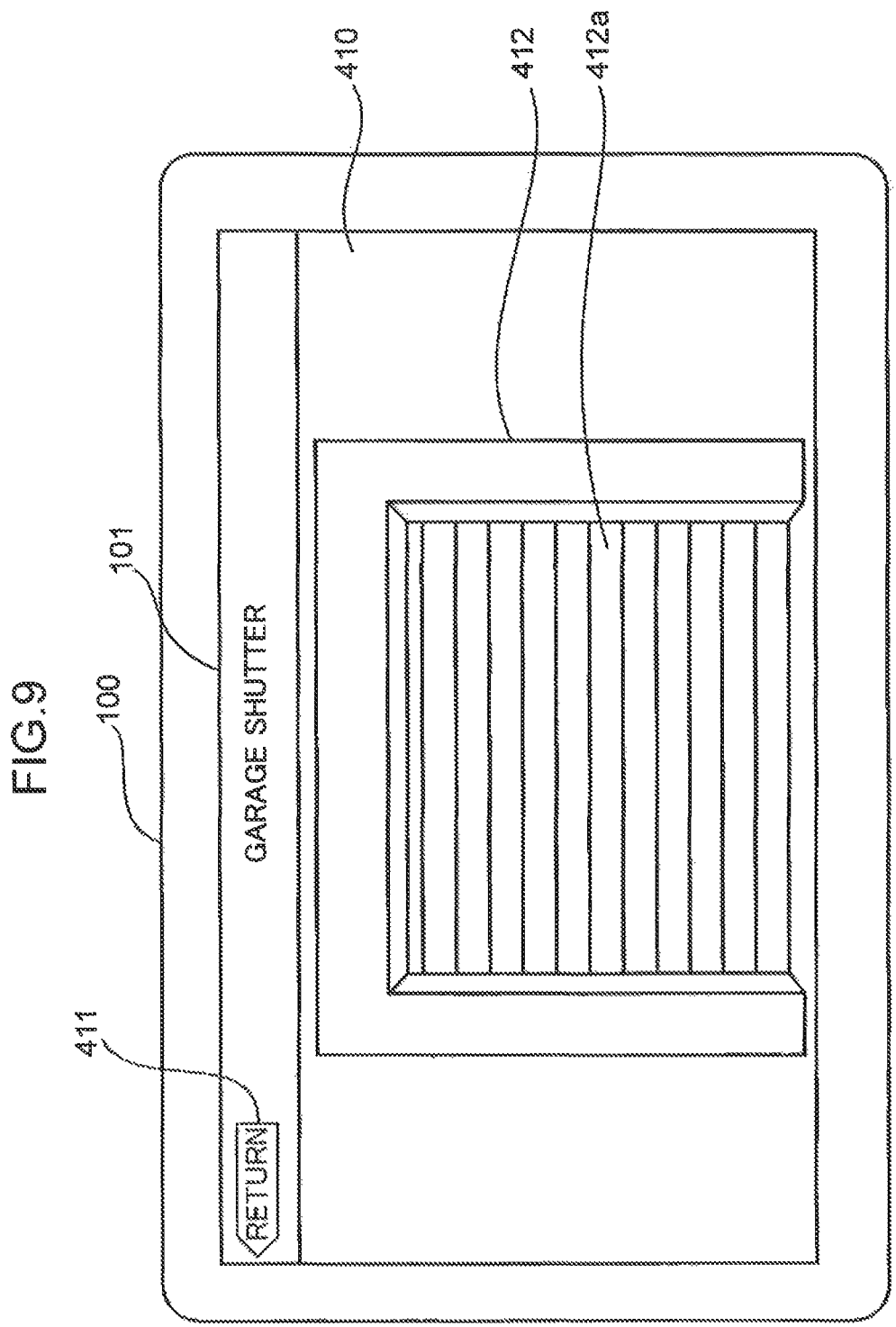
FIG. 9 is a diagram showing an example of a shutter control screen displayed on the display of the operation terminal.

FIG. 9 is a diagram showing an example of a shutter control screen 410 displayed on the display 101 of the operation terminal 100. The shutter control screen 410 shown in FIG. 9 is an operation screen that allows performing an open/close operation for the shutter 220 of the electric shutter device 200. As described above, the shutter 220 is used as a gate provided in the garage 310.

The shutter control screen 410 includes a return button 411, and a shutter image 412 representing the shutter 220 of the electric shutter device 200. The shutter image 412 includes a shutter 412a. In addition, a text "GARAGE SHUTTER" is affixed to the shutter control screen 410 in FIG. 9. This allows the user to easily understand that the screen is a control screen for a shutter used as a gate provided in the garage.

When the user selects the select button 405A with a contacting object (for example, one finger of the user) in the shutter select screen 400 shown in FIG. 8, the touch panel control section 102 senses the selection. Then, as shown in FIG. 9, the display control section 103 displays the shutter control screen 410 corresponding to the select button 405A on the display 101.

Moreover, when the user selects the return button 411 with the contacting object in the shutter control screen 410 shown in FIG. 9, the touch panel control section 102 senses the selection. Then, the display control section 103 returns the display on the display 101 to the shutter select screen 400 shown in FIG. 8.

Figure 10:
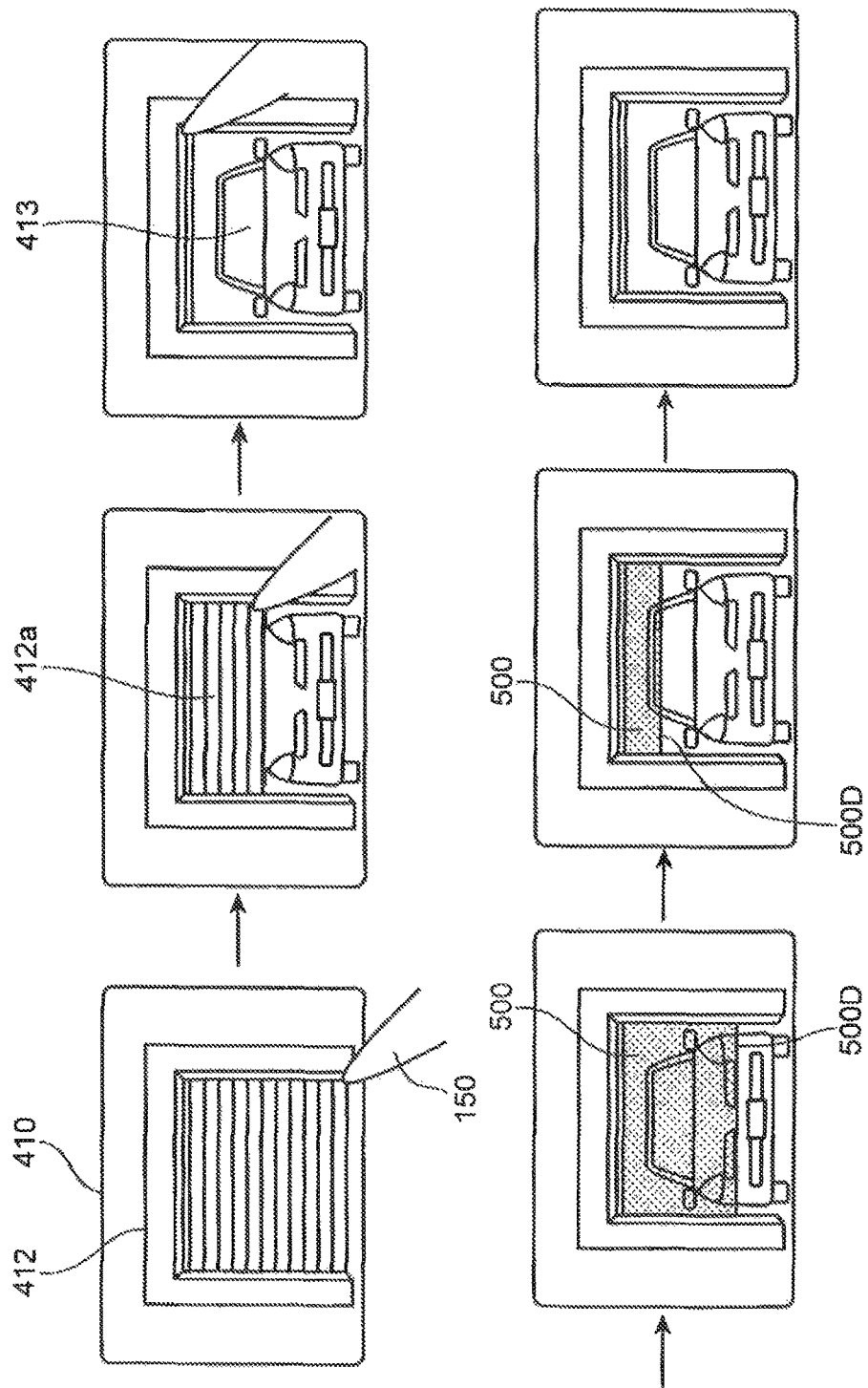
FIG. 10 is a diagram showing an example of display on the shutter control screen and an example of an operation by a contacting object when opening the shutter.
Figure 11:
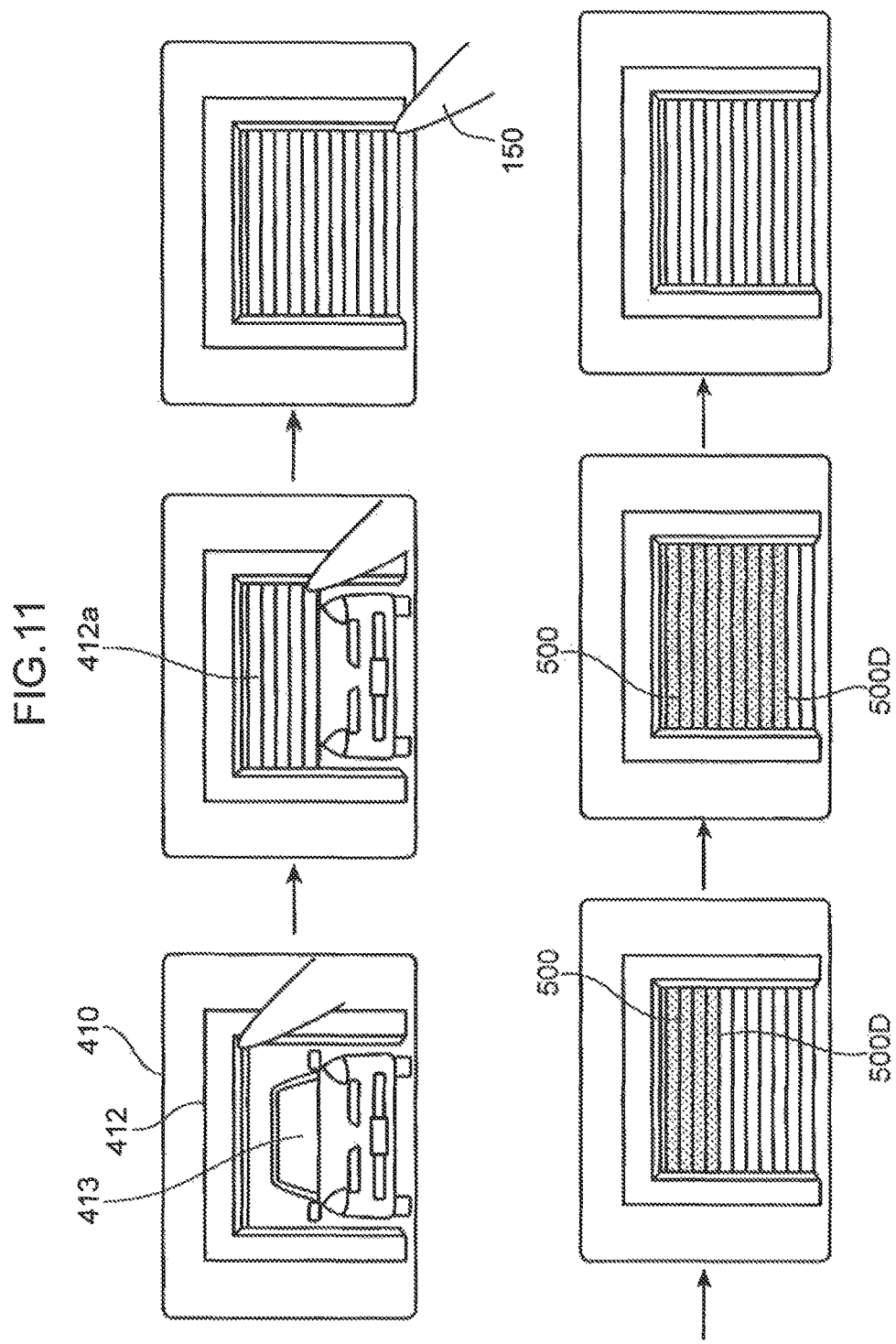
FIG. 11 is a diagram showing an example of display on the shutter control screen and an example of an operation by the contacting object when closing the shutter.

FIG. 10 is a diagram showing an example of display on the shutter control screen 410 and an example of an operation by a contacting object 150 when opening the shutter 220. FIG. 11 is a diagram showing an example of display on the shutter control screen 410 and an example of an operation by the contacting object 150 when closing the shutter 220.

First, an operation of opening the shutter 220 of the electric shutter device 200 will be described with reference to FIG. 10. The shutter image 412 in which the shutter 412a is fully closed is displayed (the upper left diagram of FIG. 10). In this state, the touch panel control section 102 senses an upward swipe operation by the contacting object 150 (for example, one finger of the user) on the shutter control screen 410 (the upper left diagram to the upper middle diagram of FIG. 10).

Then, the display control section 103 moves the shutter 412a within the shutter image 412 in the opening direction in accordance with movement of the contacting object 150 (the upper middle diagram of FIG. 10). At this time, the display control section 103 displays a vehicle image 413 representing a vehicle in the garage which has been hidden behind the shutter in a region corresponding to the shutter image 412 as the shutter 412a within the shutter image 412 is opened (the upper middle diagram of FIG. 10).

In the upper middle diagram of FIG. 10, the lower half of the vehicle image 413 has appeared. In order to achieve image display such as that in the upper middle diagram of FIG. 10, for example, the shutter 412a within the shutter image 412 may be provided in a first layer, the vehicle image 413 may be provided in a second layer, and the order of priority for image display of the first layer may be made higher than that of the second layer.

Further, if the upward swipe operation by the contacting object 150 is continued, the touch panel control section 102 senses the swipe operation (the upper middle diagram to the upper right diagram of FIG. 10). Then, when the shutter 412a within the shutter image 412 is fully open, the display control section 103 erases the shutter 412a, and displays the vehicle image 413 representing the entire vehicle (the upper right diagram of FIG. 10).

When the touch panel control section 102 senses an upward swipe operation by the contacting object 150 on the shutter control screen 410, the shutter control section 105 generates a control command (corresponding to an example of the movement control command) for opening the shutter 220 of the electric shutter device 200. At this time, the shutter control section 105 decides the target position for the opening shutter on the basis of the amount of movement of the swipe operation by the contacting object 150.

When the user finishes the upward swipe operation in the state shown in the upper middle diagram of FIG. 10, for example, the shutter control section 105 decides a position at which the shutter is half open as the target position for the opening shutter. In this case, the display control section 103 renders the shutter 412a within the shutter image 412 half open as shown in the upper middle diagram of FIG. 10. Display of the shutter 412a allows the user to easily understand the target position for the shutter.

When the user finishes the upward swipe operation in the state shown in the upper right diagram of FIG. 10, for example, the shutter control section 105 decides a position at which the shutter is fully open as the target position for opening and closing of the shutter. In this case, the display control section 103 erases the shutter 412a within the shutter image 412 as shown in the upper right diagram of FIG. 10 to indicate that the target position for opening and closing of the shutter is the fully open position.

When the target position is decided, the shutter control section 105 generates a control command for opening the shutter 220 to the decided target position. The shutter control section 105 generates a control command corresponding to the decided target position. That is, the shutter control section 105 generates a control command (corresponding to an example of the distance control command) for opening the shutter 220 of the electric shutter device 200 for a distance corresponding to the amount of movement of the swipe operation by the contacting object 150.

The communication control section 106 transmits the generated control command to the control unit 210 of the electric shutter device 200. The shutter control section 213 of the electric shutter device 200 receives the control command transmitted from the operation terminal 100 via the communication control section 214. The shutter control section 213 controls the drive section 211 to start operation of opening the shutter 220 in accordance with the received control command. The lower left diagram, the lower middle diagram, and the lower right diagram of FIG. 10 will be described later.

Next, an operation of closing the shutter 220 of the electric shutter device 200 will be described with reference to FIG. 11. The shutter image 412 in which the shutter is fully open is displayed, and the vehicle image 413 representing the entire vehicle in the garage is displayed in a region corresponding to the shutter image 412 (the upper left diagram of FIG. 11). In this state, the touch panel control section 102 senses a downward swipe operation by the contacting object 150 on the shutter control screen 410 (the upper left diagram to the upper middle diagram of FIG. 11).

Then, the display control section 103 moves the shutter 412a within the shutter image 412 in the closing direction in accordance with movement of the contacting object 150 (the upper middle diagram of FIG. 11). At this time, the display control section 103 hides the vehicle image 413 displayed in the region corresponding to the shutter image 412 behind the shutter 412a as the shutter 412a within the shutter image 412 is closed (the upper middle diagram of FIG. 11).

In the upper middle diagram of FIG. 11, the upper half of the vehicle image 413 is hidden behind the shutter 412a. In order to achieve image display such as that in the upper middle diagram of FIG. 11, as described above, for example, the shutter 412a within the shutter image 412 may be provided in a first layer, the vehicle image 413 may be provided in a second layer, and the order of priority for image display of the first layer may be made higher than that of the second layer.

Further, if the downward swipe operation by the contacting object 150 is continued, the touch panel control section 102 senses the swipe operation (the upper middle diagram to the upper right diagram of FIG. 11). Then, when the shutter 412a within the shutter image 412 is fully closed, the display control section 103 erases the vehicle image 413 (the upper right diagram of FIG. 11).

When the touch panel control section 102 senses a downward swipe operation by the contacting object 150 on the shutter control screen 410, the shutter control section 105 generates a control command (corresponding to an example of the movement control command) for closing the shutter 220 of the electric shutter device 200. At this time, the shutter control section 105 decides the target position for the closing shutter on the basis of the amount of movement of the swipe operation by the contacting object 150.

When the user finishes the downward swipe operation in the state shown in the upper middle diagram of FIG. 11, for example, the shutter control section 105 decides a position at which the shutter is half closed as the target position for the closing shutter. in this case, the display control section 103 renders the shutter 412a within the shutter image 412 half closed as shown in the upper middle diagram of FIG. 11.

When the user finishes the downward swipe operation in the state shown in the upper right diagram of FIG. 11, for example, the shutter control section 105 decides a position at which the shutter is fully closed as the target position for the closing shutter. In this case, the display control section 103 renders the shutter 412a within the shutter image 412 fully closed as shown in the upper right diagram of FIG. 11.

When the target position is decided, the shutter control section 105 generates a control command for closing the shutter 220 to the decided target position. The shutter control section 105 generates a control command corresponding to the decided target position. That is, the shutter control section 105 generates a control command (corresponding to an example of the distance control command) for closing the shutter 220 of the electric shutter device 200 for a distance corresponding to the amount of movement of the swipe operation by the contacting object 150.

The communication control section 106 transmits the generated control command to the control unit 210 of the electric shutter device 200. The shutter control section 213 of the electric shutter device 200 receives the control command transmitted from the operation terminal 100 via the communication control section 214. The shutter control section 213 controls the drive section 211 to start operation of closing the shutter 220 in accordance with the received control command. The lower left diagram, the lower middle diagram, and the lower right diagram of FIG. 11 will be described next.

As described above, the shutter control section 213 controls the drive section 211 to start operation of opening and closing the shutter 220 in accordance with the received control command. Specifically, operation of opening the shutter 220 is started in FIG. 10, and operation of closing the shutter 220 is started in FIG. 11.

At this time, actual motion of the shutter 220 is slower than motion of the shutter 412a within the shutter image 412 displayed on the shutter control screen 410. Thus, in the embodiment of FIGS. 10 and 11, as described below, the display control section 103 displays a schematic shutter movement image 500 representing the actual position of an end portion of the shutter 220 as overlapped on the shutter 412a within the shutter image 412 on the shutter control screen 410. In other words, the display control section 103 displays the schematic shutter movement image 500 in a region corresponding to the shutter image 412.

When the drive section 211 starts open/close operation of the shutter, the shutter control section 213 of the electric shutter device 200 repeatedly acquires the result of detection of the position of the shutter 220 performed by the position sensor 212. The shutter control section 213 may acquire the result of detection of the position of the shutter 220 performed by the position sensor 212 at certain intervals (for example, 0.1 seconds). The shutter control section 213 generates positional information indicating the position of the shutter 220 on the basis of the result of detection of the position of the shutter 220 performed by the position sensor 212 at each acquisition of the detection result. The positional information may be a numerical value representing the proportion at which the shutter 220 is closed with the fully closed state defined as 100% and the fully open state defined as 0%, for example. In this case, the positional information on the shutter 220 which is halfway closed as in the upper middle diagram of FIG. 11, for example, is 50%.

Each time the shutter control section 213 generates positional information indicating the position of the shutter 220, the communication control section 214 transmits the generated positional information to the operation terminal 100. When it is determined on the basis of the result of detection of the position of the shutter 220 performed by the position sensor 212 that the target position for the shutter 220 included in the control command is reached, the shutter control section 213 controls the drive section 211 so as to stop open/close operation of the shutter 220.

The display control section 103 of the operation terminal 100 receives the positional information indicating the position of the shutter 220 and transmitted from the electric shutter device 200 via the communication control section 106. The display control section 103 displays the schematic shutter movement image 500 representing the actual position of the end portion of the shutter 220 as overlapped on the vehicle image 413 on the shutter control screen 410 as shown in the lower left diagram of FIG. 10, for example, on the basis of the received positional information. The display control section 103 displays the schematic shutter movement image 500 representing the actual position of the end portion of the shutter 220 as overlapped on the shutter 412a within the shutter image 412 on the shutter control screen 410 as shown in the lower left diagram of FIG. 11, for example, on the basis of the received positional information.

In FIG. 10, the position of a lower end 500D of the schematic shutter movement image 500 corresponds to the actual position of the end portion of the shutter 220 moving in the opening direction. In FIG. 11, the position of a lower end 500D of the schematic shutter movement image 500 corresponds to the actual position of the end portion of the shutter 220 moving in the closing direction.

The display control section 103 may display the schematic shutter movement image 500 in a color that is different from those of the shutter 412.a and the vehicle image 413 (red if the shutter 412a is brown and the vehicle image 413 is white, for example) and translucently on the display 101, for example. In FIG. 10, for example, the schematic shutter movement image 500 and the vehicle image 413 may be synthesized by alpha blending. In FIG. 11, for example, the schematic shutter movement image 500 and the shutter 412a may be synthesized by alpha blending.

Consequently, in FIG. 10, the schematic shutter movement image 500 and the vehicle image 413 can be distinguished from each other by color-coding. In FIG. 11, meanwhile, the schematic shutter movement image 500 and the shutter 412a can be distinguished from each other by color-coding. In FIGS. 10 and 11, the schematic shutter movement image 500 is indicated by dots.

Each time the positional information indicating the position of the shutter 220 and transmitted from the electric shutter device 200 is received, the display control section 103 displays the schematic shutter movement image 500 as updated on the basis of the received positional information. For example, in the case where the positional information is received from the electric shutter device 200 every 0.1 seconds, the display control section 103 displays the schematic shutter movement image 500 as updated every 0.1 seconds.

Consequently, in FIG. 10, the position of the lower end 500D of the schematic shutter movement image 500 is raised corresponding to the actual position of the end portion of the shutter moving in the opening direction (the lower left diagram to the lower middle diagram of FIG. 10). In FIG. 11, meanwhile, the position of the lower end 500D of the schematic shutter movement image 500 is lowered corresponding to the actual position of the end portion of the shutter moving in the closing direction (the lower left diagram to the lower middle diagram of FIG. 11).

As a result, the actual position of the shutter 220 which gradually opens and closes is represented in the schematic shutter movement image 500 on the shutter control screen 410. Then, when the position of the shutter 220 represented by the schematic shutter movement image 500 reaches the target position (the fully open position in FIG. 10, and the fully closed position in FIG. 11), the display control section 103 erases the schematic shutter movement image 500 from the shutter control screen 410 as shown in the lower right diagram of FIG. 10 and the lower right diagram of FIG. 11.

The schematic shutter movement image 500 between the state in which the shutter is fully closed and the state shown in the lower left diagram of FIG. 10, the schematic shutter movement image 500 between the states shown in the lower left diagram and the lower middle diagram of FIG. 10, and the schematic shutter movement image 500 between the states shown in the lower middle diagram and the lower right diagram of FIG. 10 are not shown. In addition, the schematic shutter movement image 500 between the state in which the shutter is fully open and the state shown in the lower left diagram of FIG. 11, the schematic shutter movement image 500 between the states shown in the lower left diagram and the lower middle diagram of FIG. 11, and the schematic shutter movement image 500 between the states shown in the lower middle diagram and the lower right diagram of FIG. 11 are not shown.

In the embodiment, as has been described above, the display control section 103 displays the schematic shutter movement image 500 representing the actual position of the end portion of the shutter 220 on the shutter control screen 410. Thus, the user can confirm the actual position of the shutter 220 without going to see the shutter 220 in the garage 310. In addition, the display control section 103 displays the shutter image 412 representing the target position for opening and closing of the shutter on the shutter control screen 410 in addition to the schematic shutter movement image 500. Thus, the user can easily understand the difference between the target position and the current position of the shutter 220. In the embodiment, the schematic shutter movement image 500 corresponds to an example of the state information representing the position of the end portion of the shutter of the electric shutter device.

The mode of representation of the actual position of the end portion of the shutter 220 on the shutter control screen 410 is not limited to the schematic shutter movement image 500. Another display example in which the actual position of the end portion of the shutter 220 is represented on the shutter control screen 410 will be described below.

Figure 12:
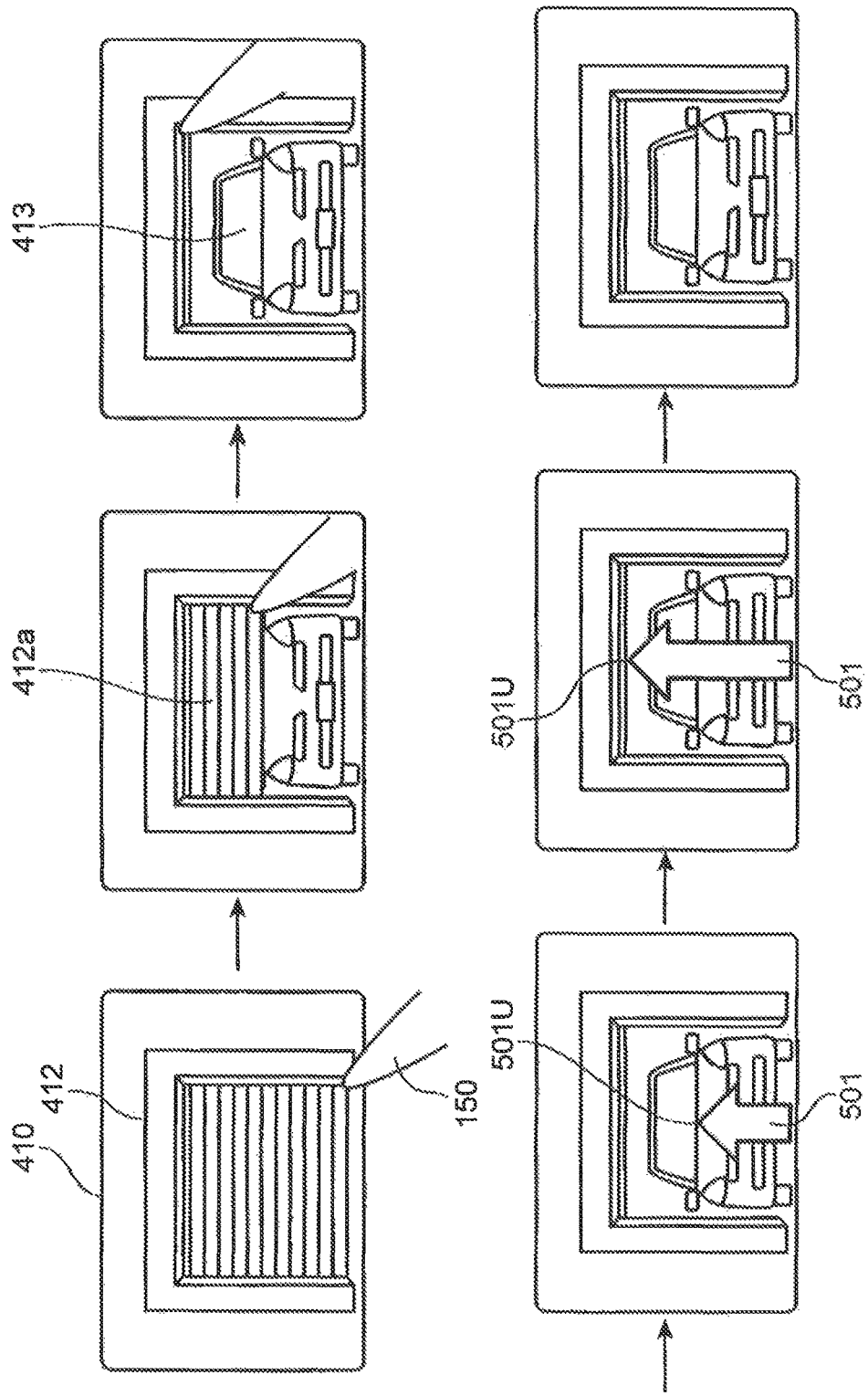
FIG. 12 is a diagram showing a display example of the shutter control screen which is different from FIG. 10 and in which an actual position of the shutter is displayed when opening the shutter.
Figure 13:
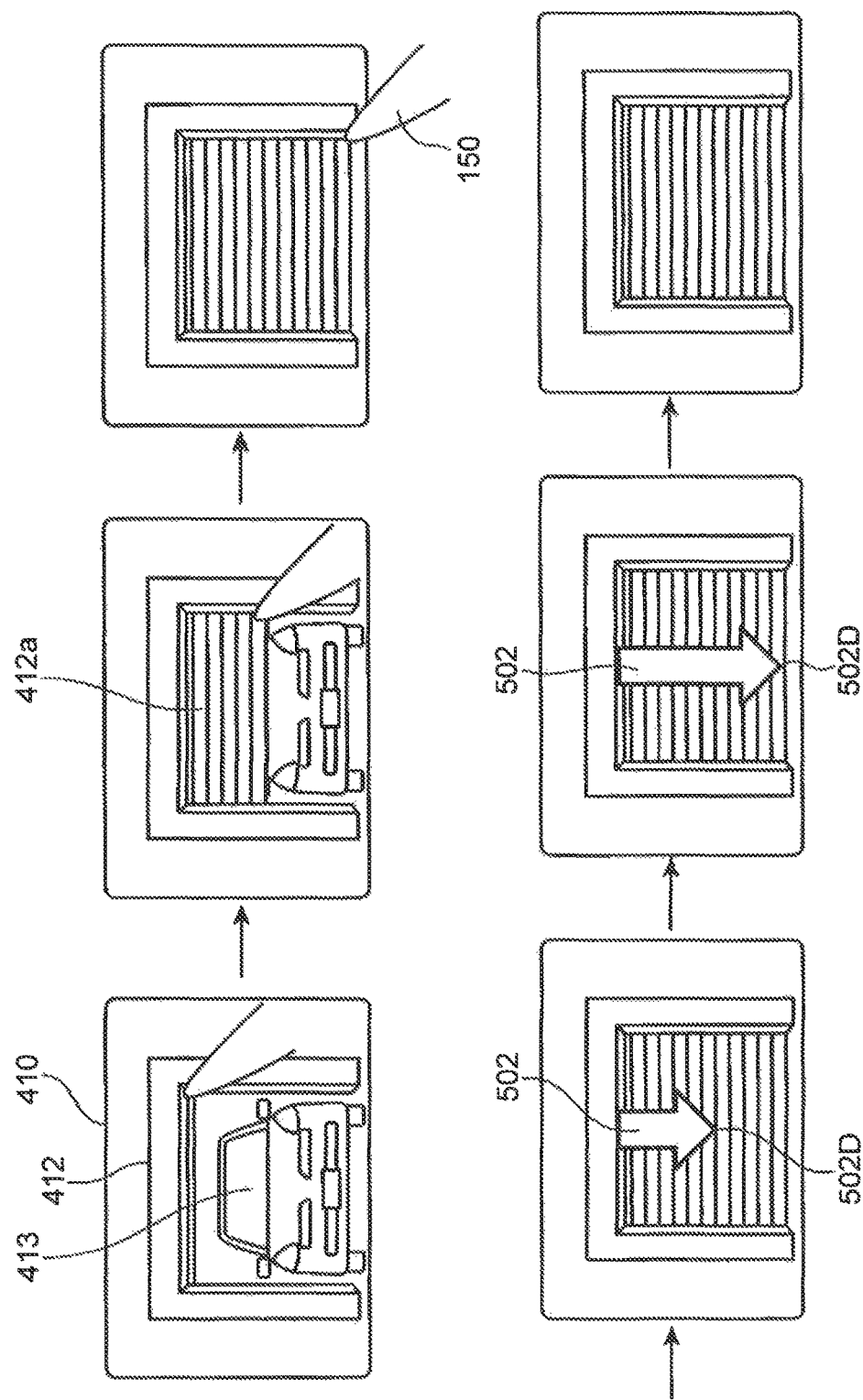
FIG. 13 is a diagram showing a display example of the shutter control screen which is different from FIG. 11 and in which the actual position of the shutter is displayed when closing the shutter.

FIG. 12 is a diagram showing a display example of the shutter control screen 410 which is different from FIG. 10 and in which the actual position of the shutter is displayed when opening the shutter. FIG. 13 is a diagram showing a display example of the shutter control screen 410 which is different from FIG. 11 and in which the actual position of the shutter is displayed when closing the shutter. The upper left diagram, the upper middle diagram, and the upper right diagram of FIG. 12 are the same as the upper left diagram, the upper middle diagram, and the upper right diagram, respectively, of FIG. 10. In addition, the upper left diagram, the upper middle diagram, and the upper right diagram of FIG. 13 are the same as the upper left diagram, the upper middle diagram, and the upper right diagram, respectively, of FIG. 11.

As described above, the display control section 103 of the operation terminal 100 receives the positional information indicating the position of the shutter 220 and transmitted from the electric shutter device 200 via the communication control section 106. The display control section 103 displays a position display mark 501 (the lower left diagram and the lower middle diagram of FIG. 12) representing the actual position of the end portion of the shutter 220 as overlapped on the vehicle image 413 on the shutter control screen 410 on the basis of the received positional information. In addition, the display control section 103 displays a position display mark 502 (the lower left diagram and the lower middle diagram of FIG. 13) representing the actual position of the end portion of the shutter 220 as overlapped on the shutter 412a within the shutter image 412 on the shutter control screen 410 on the basis of the received positional information.

As shown in the lower left diagram of FIG. 12, the position display mark 501 for a case where the shutter is opened is constituted of an arrow extending upward from the lower end of a. region corresponding to the shutter image 412 on the shutter control screen 410. In FIG. 12, the position of an upper end 501U of the position display mark 501 corresponds to the actual position of the end portion of the shutter moving in the opening direction.

As shown in the lower left diagram of FIG. 13, the position display mark 502 for a case where the shutter is closed is constituted of an arrow extending downward from the upper end of a region corresponding to the shutter image 412 on the shutter control screen 410. In FIG. 13, the position of a lower end 502D of the position display mark 502 corresponds to the actual position of the end portion of the shutter moving in the closing direction.

Each time the positional information indicating the position of the shutter 220 and transmitted from the electric shutter device 200 is received, the display control section 103 displays the position display mark 501 (the lower left diagram to the lower middle diagram of FIG. 12) and the position display mark 502 (the lower left diagram to the lower middle diagram of FIG. 13) as updated on the basis of the received positional information. For example, in the case where the positional information is received from the electric shutter device 200 every 0.1 seconds, the display control section 103 displays the position display marks 501 and 502 as updated every 0.1 seconds.

As a result, the actual position of the shutter which gradually opens and closes is represented by the position display marks 501 and 502 on the shutter control screen 410. Then, when the position of the shutter represented by the position display marks 501 and 502 reaches the target position (the fully open position in FIG. 12, and the fully closed position in FIG. 13), the display control section 103 erases the position display marks 501 and 502 from the shutter control screen 410 as shown in the lower right diagram of FIG. 12 and the lower right diagram of FIG. 13.

The position display mark 501 between the state in which the shutter is fully closed and the state shown in the lower left diagram of FIG. 12, the position display mark 501 between the states shown in the lower left diagram and the lower middle diagram of FIG. 12, and the position display mark 501 between the states shown in the lower middle diagram and the lower right diagram of FIG. 12 are not shown. in addition, the position display mark 502 between the state in which the shutter is fully open and the state shown in the lower left diagram of FIG. 13, the position display mark 502 between the states shown in the lower left diagram and the lower middle diagram of FIG. 13, and the position display mark 502 between the states shown in the lower middle diagram and the lower right diagram of FIG. 13 are not shown.

In FIGS. 10 to 13, the display control section 103 displays an image representing the actual position of the end portion of the shutter 220 as overlapped on the shutter 412a within the shutter image 412 on the shutter control screen 410. However, the present disclosure is not limited thereto. The display control section 103 may not display an image representing the actual position of the end portion of the shutter 220 on the shutter control screen 410.

FIG. 14 is a sequence diagram showing a process flow in the operation terminal 100 and the electric shutter device 200. First, upon receiving a request from the display control section 103, the communication control section 106 of the operation terminal 100 transmits a request to acquire the present open/close state of the shutter 220 (for example, the position of the end portion of the shutter 220) to the electric shutter device 200 (S1401). Next, when the acquisition request is received via the communication control section 214, the shutter control section 213 of the electric shutter device 200 acquires the open/close state of the shutter 220 from the position sensor 212 (S1402).

Upon receiving a request from the shutter control section 213, the communication control section 214 transmits the open/close state of the shutter 220 to the operation terminal 100 (S1403). The display control section 103 of the operation terminal 100 receives the open/close state of the shutter 220 via the communication control section 106. The display control section 103 displays the shutter control screen 410 on the display 101 on the basis of the received open/close state of the shutter 220 (S1404). For example, in the case where the shutter 220 is fully open, the display control section 103 displays the shutter control screen 410 shown in the upper left diagram of FIG. 11 on the display 101.

Next, the touch panel control section 102 of the operation terminal 100 senses an operation (for example, an upward swipe operation, or a downward swipe operation) of the contacting object 150 performed by the user on the shutter control screen 410 (S1405). Next, the display control section 103 of the operation terminal 100 moves the shutter 412a within the shutter image 412 so as to represent the target position for opening and closing of the shutter 220 in accordance with the amount of movement of the contacting object 150 (S1406).

In the operation terminal 100, S1405 and S1406 included in L1401 are repeated until the touch panel control section 102 senses that the contacting object 150 is moved away from the display 101. As a result, the shutter control screen 410 shown in the upper left diagram of FIG. 10 is displayed on the display 101, for example. In this state, after a swipe operation is performed for half an amount of movement for fully opening the shutter 220, the contacting object 150 is moved away from the display 101.

Then, the display control section 103 displays the shutter control screen 410 shown in the upper middle diagram of FIG. 10 on the display 101. That is, the position of the shutter 412a within the shutter image 412 shown in the upper middle diagram of FIG. 10 is determined as the target position for opening of the shutter 220.

When the touch panel control section 102 senses that the contacting object 150 is moved away from the display 101, the shutter control section 105 of the operation terminal 100 generates a control command in accordance with the amount of movement of the swipe operation by the contacting object 150. Upon receiving a request from the shutter control section 105, the communication control section 106 transmits the control command generated by the shutter control section 105 to the electric shutter device 200 (S1407).

After receiving the control command via the communication control section 214 of the electric shutter device 200, the shutter control section 213 controls the drive section 211 on the basis of the control command to perform opening operation or closing operation of the shutter 220 (S1408). Next, the shutter control section 213 detects the current open/close state of the shutter 220 (for example, the current position of the end portion of the shutter 220) using the position sensor 212. The shutter control section 213 generates positional information indicating the open/close state (position) of the shutter 220 on the basis of the detection result (S1409).

Upon receiving a request from the shutter control section 213, the communication control section 214 transmits the generated positional information indicating the current open/close state of the shutter 220 to the operation terminal 100 (S1410).

Next, the display control section 103 of the operation terminal 100 displays the current open/close state of the shutter 220 on the shutter control screen 410 of the display 101 on the basis of the positional information received via the communication control section 106 (S1411). In S1411, the display control section 103 displays the schematic shutter movement image 500 in the embodiment of FIGS. 10 and 11, displays the position display marks 501 in the embodiment of FIG. 12, and displays the position display mark 502 in the embodiment of FIG. 13.

In the operation terminal 100 and the electric shutter device 200, S1408 to S1411 included in L1402 are repeated until the open/close state of the shutter 220 (for example, the position of the end portion of the shutter 220) reaches the target position. Thus, display of the current open/close state of the shutter 220 is updated each time S1411 is executed.

When the open/close state of the shutter 220 reaches the target position, the communication control section 214 receives a request from the shutter control section 213, and transmits the result of control for the shutter 220 to the operation terminal 100 (S1412). The process is thus terminated.

FIG. 15 is a flowchart showing a process flow for the operation terminal 100 to control the electric shutter device 200.

First, the display control section 103 displays the shutter select screen 400 on the display 101 (S1501). Subsequently, a user operation through contact of the contacting object 150 on the shutter select screen 400 is received (S1502). Next, the touch panel control section 102 judges whether or not the contact target for the contacting object 150 is the end button 407 (S1503).

When the touch panel control section 102 judges that the contact target is the end button 407 (YES in S1503), the flow is terminated. When the touch panel control section 102 judges that the contact target is not the end button 407 (NO in S1503), on the other hand, the touch panel control section 102 judges a select button of the contact target. The display control section 103 acquires the current open/close state of a shutter corresponding to the judged select button from the electric shutter device (S1504). For example, if the touch panel control section 102 judges that the contact target is the select button 405A, the display control section 103 acquires the open/close state of the shutter 220 from the electric shutter device 200.

Next, the display control section 103 displays a shutter control screen corresponding to the select button of the contact target on the display 101 (S1505). For example, in the case where the contact target is the select button 405A, the display control section 103 displays the shutter control screen 410 shown in FIG. 9 on the display 101. Subsequently, the process is advanced to a control flow for a shutter (FIGS. 16A and 16B) (S1506). After that, the process returns to S1501.

Figure 16A:
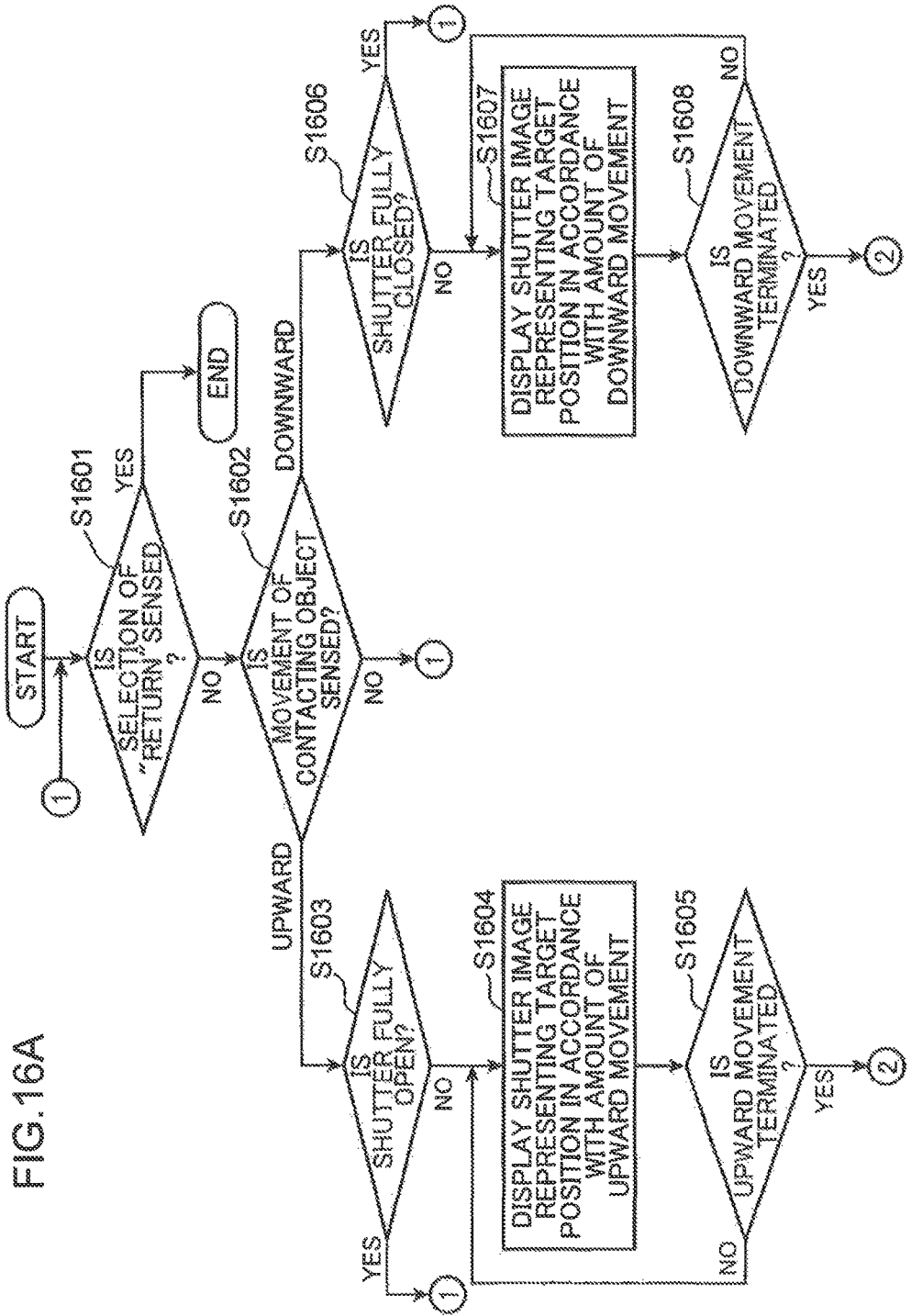
FIG. 16A is a flowchart showing a process flow for the operation terminal to generate and transmit a control command for controlling the shutter of the electric shutter device.
Figure 16B:
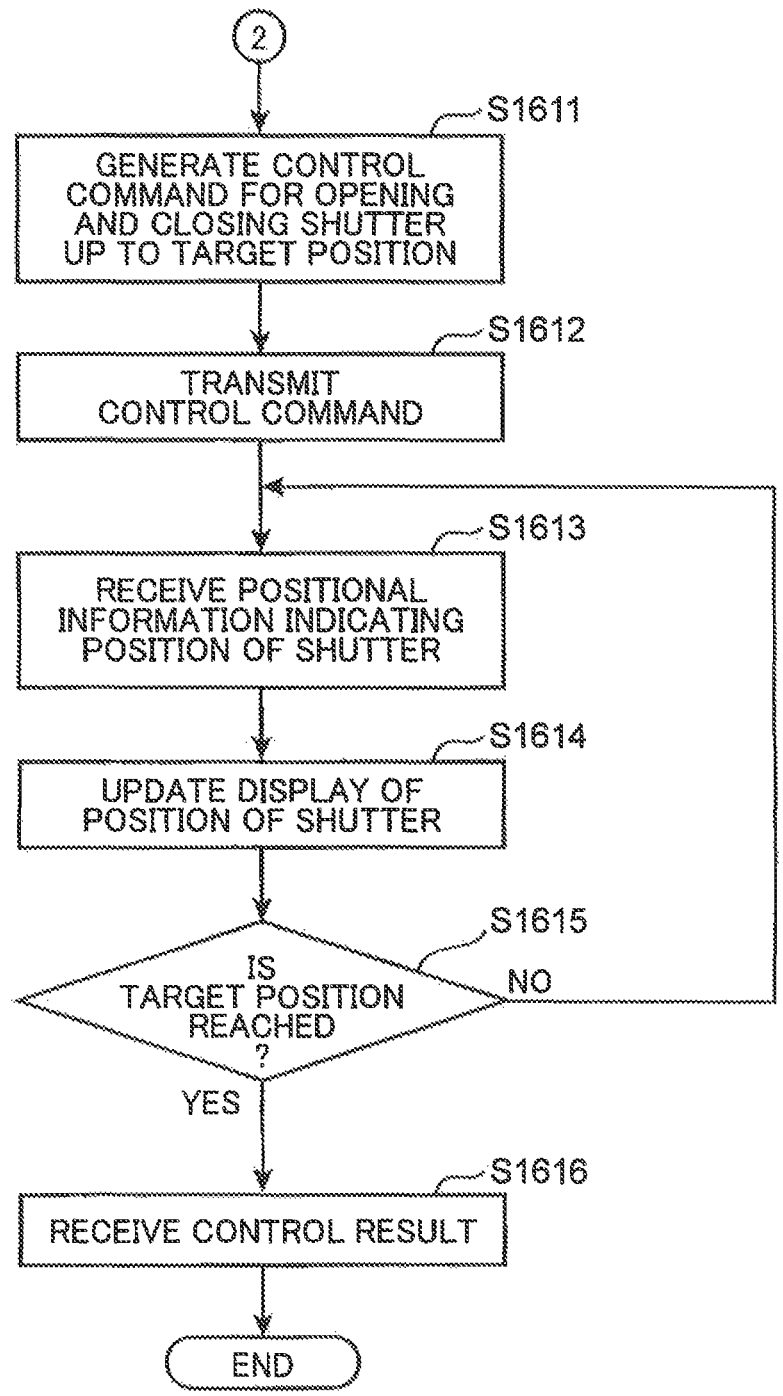
FIG. 16B is a flowchart showing a process flow for the operation terminal to generate and transmit a control command for controlling the shutter of the electric shutter device.

FIGS. 16A and 16B are flowcharts showing a flow of the process (S1506 of FIG. 15) for the operation terminal 100 to generate and transmit a control command for controlling the shutter 220 of the electric shutter device 200.

First, the touch panel control section 102 judges whether or not selection of the return button 411 by the contacting object 150 is sensed in the shutter control screen 410 (S1601). When selection of the return button 411 is sensed (YES in S1601), the flow is terminated. If selection of the return button 411 is not sensed (NO in S1601), the touch panel control section 102 judges whether or not upward or downward movement of the position of contact by the contacting object 150 is sensed (S1602).

If the touch panel control section 102 senses upward movement of the position of contact by the contacting object 150 in S1602, the process is advanced to S1603. If the touch panel control section 102 senses downward movement, the process is advanced to S1606. If upward or downward movement of the position of contact by the contacting object 150 is not sensed (NO in S1602), the process returns to S1601.

In S1603, the display control section 103 judges, on the basis of the open/close state acquired in S1504 of FIG. 15, whether or not the shutter 220 of the electric shutter device 200 is fully open. If the shutter 220 is fully open (YES in S1603), the process returns to S1601. If the shutter 220 is not fully open (NO in S1603), the process is advanced to S1604.

In S1604, the display control section 103 moves the shutter 412a within the shutter image 412 displayed on the display 101 so as to represent the target position for the opening shutter 220 corresponding to the amount of the upward movement (upward swipe operation) of the contacting object 150 acquired from the touch panel control section 102 (S1604).

Next, the display control section 103 judges whether or not upward movement of the contacting object 150 is terminated (S1605). If the upward movement of the contacting object 150 is not terminated (NO in S1605), the process returns to S1604. If the upward movement of the contacting object 150 is terminated in S1605 (YES in S1605), on the other hand, the process is advanced to S1611.

Thus, S1604 is executed until the upward movement is terminated. As a result, the shutter 412a within the shutter image 412 displayed on the display 101 is updated each time S1604 is executed. The shutter 412a within the shutter image 412 between the states shown in the upper left diagram and the upper middle diagram of FIG. 10, and between the states shown in the upper middle diagram and the upper right diagram of FIG. 10 is not shown.

In S1606, the display control section 103 judges, on the basis of the open/close state acquired in S1504 of FIG. 15, whether or not the shutter 220 of the electric shutter device 200 is fully closed. If the shutter 220 is fully closed (YES in S1606), the process returns to S1601. If the shutter 220 is not fully closed (NO in S1606), the process is advanced to s1607.

In S1607, the display control section 103 moves the shutter 412a within the shutter image 412 displayed on the display 101 so as to represent the target position for the closing shutter 220 corresponding to the amount of the downward movement (downward swipe operation) of the contacting object 150 acquired from the touch panel control section 102 (S1607).

Next, the display control section 103 judges whether or not downward movement of the contacting object 150 is terminated (S1608). If the downward movement of the contacting object 150 is not terminated (NO in S1608), the process returns to S1607. If the downward movement of the contacting object 150 is terminated in S1608 (YES in S1608), on the other hand, the process is advanced to S1611.

Thus, S1607 is executed until the downward movement is terminated. As a result, the shutter 412*a* within the shutter image 412 displayed on the display 101 is updated each time S1607 is executed. The shutter 412*a* within the shutter image 412 between the states shown in the upper left diagram and the upper middle diagram of FIG. 11 and between the states shown in the upper middle diagram and the upper right diagram of FIG. 11 is not shown.

In S1611, the shutter control section 105 generates a control command for opening and closing the shutter 220 to the target position corresponding to the amount of the upward movement or the downward movement of the contacting object 150 acquired from the touch panel control section 102. Subsequently, the communication control section 106 transmits the control command generated by the shutter control section 105 to the electric shutter device 200 (S1612).

Subsequently, the communication control section 106 receives positional information indicating the position (open/close state) of the shutter 220, and delivers the received positional information to the display control section 103 and the shutter control section 105 (S1613). Then, the display control section 103 displays the position of the shutter 220 on the basis of the received positional information (S1614). in S1614, the display control section 103 displays the schematic shutter movement image 500 in the embodiment of FIGS. 10 and 11, displays the position display mark 501 in the embodiment of FIG. 12, and displays the position display mark 502 in the embodiment of FIG. 13.

Then, the shutter control section 105 judges, on the basis of the positional information received in S1613, whether or not the shutter 220 has reached the target position (S1615). If the shutter 220 has not reached the target position in S1615 (NO in S1615), the process returns to S1613. If the shutter 220 has reached the target position in S1615 (YES in S1615), on the other hand, the communication control section 106 receives the control result transmitted from the electric shutter device 200, and delivers the received control result to the shutter control section 105 (S1615). The flow is thus terminated.

Thus, S1604 is executed until the shutter 220 reaches the target position. As a result, the position of the shutter 220 displayed on the shutter control screen 410 of the display 101 is updated each time S1614 is executed (for example, at intervals of 0.1 seconds).

FIG. 17 is a flowchart showing a process flow in the electric shutter device 200. First, the communication control section 214 of the electric shutter device 200 receives a control command for opening and closing a shutter transmitted from the operation terminal 100, and delivers the control command to the shutter control section 213 (S1701). Then, the shutter control section 213 controls the drive section 211 in accordance with the received control command to drive the shutter 220 (S1702). Next, the shutter control section 213 acquires the result of detection of the open/close state (position) of the shutter 220 from the position sensor 212 (S1703).

Next, the shutter control section 213 generates positional information indicating the position of the shutter 220 on the basis of the result of detection of the open/close state of the shutter 220, and the communication control section 214 transmits the generated positional information to the operation terminal 100 (S1704).

Subsequently, the shutter control section 213 judges, on the basis of the acquired detection result, whether or not the shutter 220 has reached the target position indicated by the control command (S1705). If the shutter 220 has not reached the target position (NO in S1705), the process returns to S1702. If the shutter 220 has reached the target position in S1705 (YES in S1705), on the other hand, the communication control section 214 receives a request from the shutter control section 213, and transmits the control result to the operation terminal 100 (S1706). The flow is thus terminated.

Thus, S1704 is executed until the shutter 220 reaches the target position. As a result, the positional information indicating the position of the shutter 220 is transmitted to the operation terminal 100 each time S1704 is executed (for example, at intervals of 0.1 seconds).

As described above, the shutter control section 213 judges the presence or absence of an obstacle on the basis of the result of detection performed by the obstacle sensor 215. Then, if it is judged that there is an obstacle, the shutter control section 213 controls the drive section 211 so as not to start operation to close the shutter 220 if the shutter 220 has not started being closed, and so as to stop operation to close the shutter 220 if the shutter 220 is being closed. Display on the display 101 in this case will be described.

FIG. 18 is a diagram showing a display example of the shutter control screen 410 for a case where an obstacle is detected. The upper left diagram, the upper middle diagram, and the upper right diagram of FIG. 18 are the same as the upper left diagram, the upper middle diagram, and the upper right diagram, respectively, of FIG. 11. From the upper left diagram to the upper right diagram by way of the upper middle diagram of FIG. 18, the display control section 103 controls display on the shutter control screen 410 in the same manner as described with reference to FIG. 11.

That is, the vehicle image 413 is displayed in a region corresponding to the shutter image 412 (the upper left diagram of FIG. 18). In this state, the touch panel control section 102 senses a downward swipe operation by the contacting object 150. Then, the display control section 103 moves the shutter 412*a* within the shutter image 412 in the closing direction, that is, downward (corresponding to an example of the first direction) in accordance with the amount of movement of the swipe operation (the upper middle diagram of FIG. 18). When the downward swipe operation by the contacting object 150 is further continued, the shutter 412*a* within the shutter image 412 is fully closed, and displayed on the shutter control screen 410 as the target position for opening and closing of the shutter (the upper right diagram of FIG. 18).

If it is judged on the basis of the result of detection performed by the obstacle sensor 215 that there is an obstacle, the shutter control section 213 controls the drive section 211 so as to stop operation of the shutter 220, and generates stop information. The stop information includes information indicating that operation of the shutter 220 has been stopped. The stop information also includes information indicating the position at which the shutter 220 is stopped. Upon receiving a request from the shutter control section 213, the communication control section 214 transmits the stop information generated by the shutter control section 213 to the operation terminal 100.

When the stop information from the electric shutter device 200 is received via the communication control section 106, the display control section 103 of the operation terminal 100 returns the fully closed shutter 412a (the upper right diagram of FIG. 18) within the shutter image 412 displayed on the shutter control screen 410 in the opening direction, that is, upward (corresponding to an example of the second direction) to a half open position as indicated by an arrow mark 415 in the lower left diagram of FIG. 18. The arrow mark 415 is provided to indicate that the shutter 412a within the shutter image 412 is returned in one stroke from the fully closed position to the half open position. The arrow mark 415 is not displayed on the shutter control screen 410.

Further, the display control section 103 finely vertically vibrates the shutter 412a within the shutter image 412. The display control section 103 repeatedly moves a lower end 412D of the shutter 412a within the shutter image 412 alternately upward and downward. As a result, the display state of the shutter control screen 410 alternately transitions between the states shown in the lower left diagram and the lower right diagram of FIG. 18.

If an obstacle is detected before start of movement of the shutter 220, the shutter 412a within the shutter image 412 which has been fully closed as shown in the upper right diagram of FIG. 18 by downward movement of the contacting object 150 is immediately returned to a half open position as shown in the lower left diagram of FIG. 18. Therefore, the shutter 412a within the shutter image 412 bounces. Thus, the user can be alerted by the vibration of the shutter 412a within the shutter image 412 that operation of the shutter 220 is not normal, rather than that the display 101 is out of order.

In the case where the shutter 412a within the shutter image 412 is vibrated, the display control section 103 does not display an image (the schematic shutter movement image 500 in FIG. 11, and the position display mark 502 in FIG. 13) representing the actual position of the shutter 220. The width of the vibration may be a width of 5% in terms of the numerical value of the positional information, for example. The width of the vibration may be decided as such a value that allows the user to definitely recognize the vibration. The period of the vibration may be 0.5 seconds, for example. The period of the vibration may be decided as such a value that allows the user to easily see the vibration.

FIG. 19 is a diagram showing a display example of the shutter control screen 401 that is different from FIG. 18 for a case where an obstacle is detected. The upper left diagram, the upper middle diagram, and the upper right diagram of FIG. 19 are the same as the upper left diagram, the upper middle diagram, and the upper right diagram, respectively, of FIG. 11 (FIG. 18).

In the embodiment of FIG. 19, as in the embodiment of FIG. 18, when the stop information is received from the electric shutter device 200 via the communication control section 106, the display control section 103 returns the fully closed shutter 412a (the upper right diagram of FIG. 19) within the shutter image 412 displayed on the shutter control screen 410 to a half open position (the lower left diagram of FIG. 19).

Further, the display control section 103 displays an alerting mark 600 on the shutter control screen 410 (the lower left diagram of FIG. 19). Furthermore, as in the embodiment of FIG. 18, the display control section 103 finely vertically vibrates the shutter 412a within the shutter image 412 as indicated by a vibration mark 601 (the lower right diagram of FIG. 19).

The vibration mark 601 in the lower right diagram of FIG. 19 is intended to represent the fine vertical vibration of the shutter 412a within the shutter image 412. Upward and downward arrows and wavy lines included in the vibration mark 601 are not displayed on the shutter control screen 410. In FIG. 19, in addition, the alerting mark 600 is displayed, and therefore the display control section 103 may not vibrate the shutter 412a within the shutter image 412.

FIGS. 20 to 23 are sequence diagrams showing a process flow in the operation terminal 100 and the electric shutter device 200 for a case where obstacle detection is taken into consideration.

The sequence diagrams will be described for three patterns. A first pattern corresponds to a sequence in which an obstacle is not detected. In the first pattern, the shutter 220 is closed to the target position. For the first pattern, the sequence diagram of FIG. 20 is followed by the sequence diagram of FIG. 21.

A second pattern corresponds to a sequence in which an obstacle is detected while the shutter 220 is being closed. In the second pattern, operation of closing the shutter 220 is started. When an obstacle is detected, however, the shutter 220 stops being driven, and an alarm indication of the obstacle is displayed. In the case where the obstacle sensor 215 is of an optical type, the second pattern corresponds to a case where an obstacle appears when the shutter 220 is closed halfway. In the case where an obstacle is detected by the obstacle sensor 215 of a contact type, the sequence for the second pattern is used. For the second pattern, the sequence diagram of FIG. 20 is followed by the sequence diagram of FIG. 22.

A third pattern corresponds to a sequence in which an obstacle is first detected by the obstacle sensor 215 of an optical type. In the third pattern, an alarm indication to the obstacle is displayed before the shutter 220 is closed, and operation of closing the shutter 220 is not started. In the case where the obstacle sensor 215 is of a contact type, the sequence for the third pattern is not used. For the third pattern, the sequence diagram of FIG. 20 is followed by the sequence diagram of FIG. 23. As described above. FIG. 20 is common to the first to third patterns.

First, a process flow in the first pattern in which an obstacle is not detected will be described with reference to FIGS. 20 and 21. S2001 to S2007 of FIG. 20 are the same as S1401 to S1407, respectively, of FIG. 14. L2001 including S2005 and S2006 of FIG. 20 are the same as L1401 including S1405 and S1406 of FIG. 14. It should be noted, however, that it is assumed that in the first to third patterns, the position of the shutter 220 detected in S2002 of FIG. 20 is not the fully closed position, the operation performed in S2005 is a downward swipe operation, and the control command transmitted in S2007 is a command for closing the shutter 220.

The shutter control section 213 of the electric shutter device 200 receives a control command transmitted in S2007 of FIG. 20 via the communication control section 214, and controls the drive section 211 on the basis of the received control command so as to close the shutter 220 (S2101). Next, the shutter control section 213 judges the current open/close state of the shutter 220 using the result of detection performed by the position sensor 212, and generates positional information indicating the open/close state (position) of the shutter 220 (S2102).

Subsequently, upon receiving a request from the shutter control section 213, the communication control section 214 transmits the generated positional information indicating the current open/close state of the shutter 220 to the operation terminal 100 (S2103). Next, the display control section 103 of the operation terminal 100 displays the current open/close state of the shutter 220 on the shutter control screen 410 of the display 101 on the basis of the positional information received via the communication control section 106 (S2104).

Subsequent S2105 to S2103 are the same as S2101 to S2104, respectively. Operation in S2101 to S2104 is repeated every certain period (for example, 0.1 seconds). Then, in S2109, the shutter control section 213 detects on the basis of the result of detection performed by the position sensor 212 that the shutter 220 has reached the target position, and stops operation of the drive section 211. Next, upon receiving a request from the shutter control section 213, the communication control section 214 transmits the result of control for the shutter 220 to the operation terminal 100 (S2110).

Next, a process flow in the second pattern in which an obstacle is detected while the shutter 220 is being closed will be described with reference to FIG. 22.

The shutter control section 213 of the electric shutter device 200 receives a control command transmitted in S2007 of FIG. 20 via the communication control section 214, and controls the drive section 211 on the basis of the received control command so as to close the shutter 220 (S2201). S2201 to S2204 are the same as S2101 to S2104, respectively. Subsequent S2205 to S2208 are also the same as S2101 to S2104, respectively. Operation in S2201 to S2204 is repeated every certain period (for example, 0.1 seconds).

In S2209, the shutter control section 213 of the electric shutter device 200 judges on the basis of the result of detection performed by the obstacle sensor 215 that there is an obstacle. In addition, the shutter control section 213 stops operation of the drive section 211. Next, in S2210, upon receiving a request from the shutter control section 213, the communication control section 214 transmits stop information indicating that drive of the shutter 220 has been stopped because of detection of an obstacle to the operation terminal 100.

Next, in S2211, the display control section 103 of the operation terminal 100 displays an image alerting the user on the shutter control screen 410 of the display 101 on the basis of the stop information received via the communication control section 106. In the embodiment of FIG. 18, for example, the display control section 103 vertically vibrates the shutter 412a within the shutter image 412. In the embodiment of FIG. 19, for example, the display control section 103 displays the alerting mark 600 in a region corresponding to the shutter image 412.

Next, a process flow in the third pattern in which an obstacle is first detected by the obstacle sensor 215 of an optical type will be described with reference to FIG. 23.

The shutter control section 213 of the electric shutter device 200 receives the control command transmitted in S2007 of FIG. 20 via the communication control section 214. In subsequent S2301, however, the shutter control section 213 judges on the basis of the result of detection performed by the obstacle sensor 215 that there is an obstacle. Thus, the shutter control section 213 does not cause operation of the drive section 211 although a control command has been received. Subsequent S2302 and S2303 are the same as S2210 and S2211, respectively, of FIG. 22.

Figure 24A:
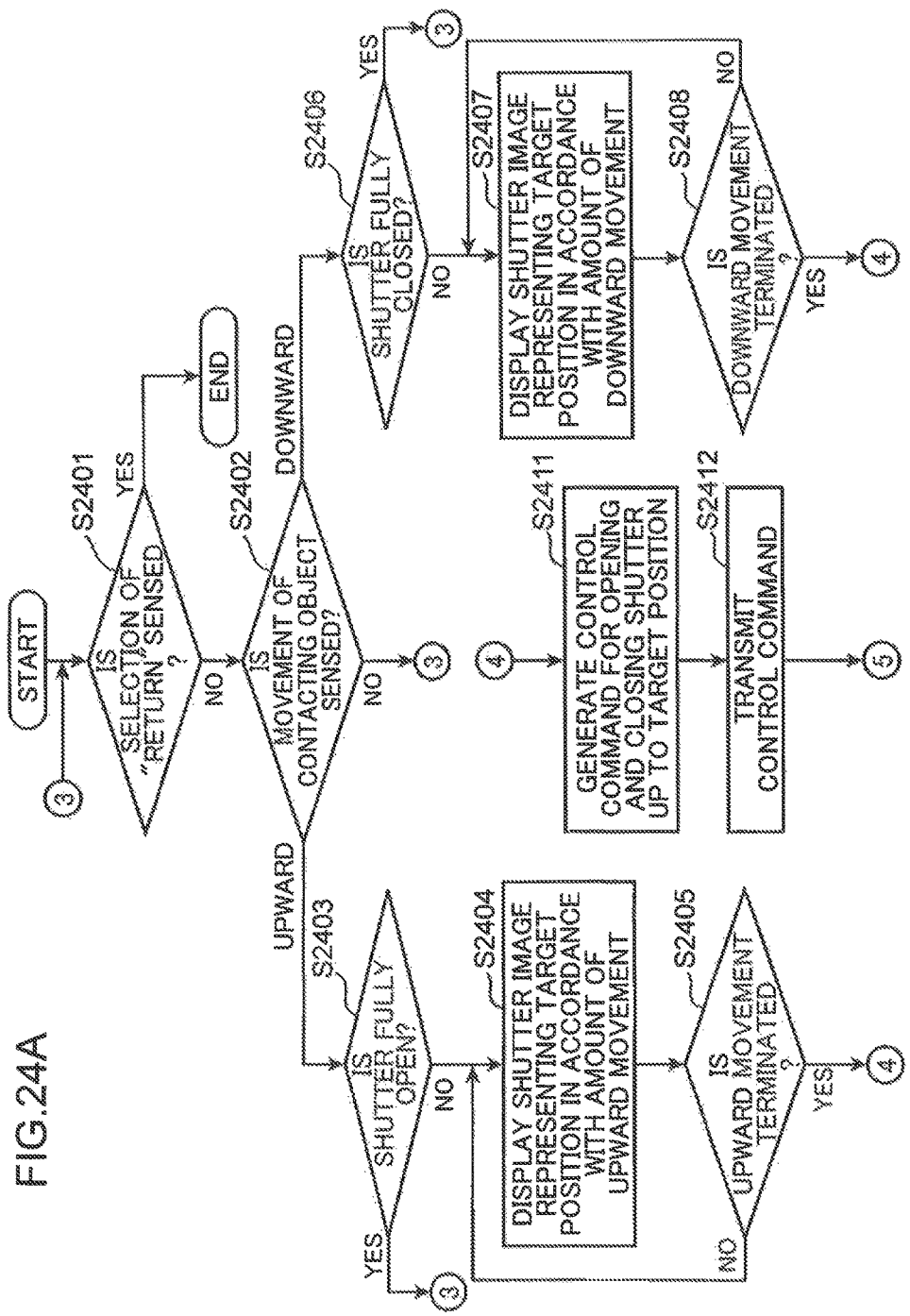
FIG. 24A is a flowchart showing a process flow for the operation terminal to control the shutter of the electric shutter device for a case where an obstacle is taken into consideration.

FIGS. 24A and 24B are flowcharts showing a flow of the process (S1506 of FIG. 15) for the operation terminal 100 to control the shutter 220 of the electric shutter device 200 for a case where an obstacle is taken into consideration.

S2401 to S2408 of FIG. 24A are the same as S1601 to S1608, respectively, of FIG. 16A. S2411 and S2412 of FIG. 24A are the same as S1611 and S1612, respectively, of FIG. 16B.

In S2421 which follows S2412, the shutter control section 105 judges whether or not the communication control section 106 has received stop information from the electric shutter device 200. If the communication control section 106 has not received the stop information in S2421 (NO in S2421), the process is advanced to S2422. If the communication control section 106 has received the stop information in S2421 (YES in S2421), on the other hand, the process is advanced to S2425.

In S2422, the communication control section 106 receives positional information indicating the position of the shutter 220, and delivers the received positional information to the display control section 103 and the shutter control section 105 (S2422). Then, the display control section 103 displays the position of the shutter 220 on the shutter control screen 410 on the basis of the received positional information (S2423). In S2423, the display control section 103 displays the schematic shutter movement image 500 in the embodiment of FIGS. 10 and 11, displays the position display mark 501 in the embodiment of FIG. 12, and displays the position display mark 502 in the embodiment of FIG. 13.

Then, the shutter control section 105 judges, on the basis of the positional information received in S2422, whether or not the shutter 220 has reached the target position (S2424). If the shutter 220 has not reached the target position in S2424 (NO in S2424), the process returns to S2421. If the shutter 220 has reached the target position in S2424 (YES in S2424), on the other hand, the flow is terminated.

In S2425, the display control section 103 judges, on the basis of the positional information received in S2422 or S1504 of FIG. 15, whether or not the actual shutter is closed to a position at which the shutter is closed beyond 70% (S2425). If the actual shutter is closed to a position at which the shutter is closed beyond 70% (YES in S2425), the display control section 103 returns the shutter 412a within the shutter image 412 being displayed to a position of 70% (S2426), and the process is advanced to S2428. If the actual shutter 220 is closed to a position of 80%, for example, the display control section 103 returns the shutter 412a within the shutter image 412 being displayed in the opening direction (corresponding to an example of the second direction) by an amount of 30% (corresponding to an example of the second predetermined amount).

If the actual shutter is not closed to a position at which the shutter is closed beyond 70% (NO in S2425), on the other hand, the display control section 103 returns the shutter 412a within the shutter image 412 being displayed to the actual position (S2427), and the process is advanced to S2428. If the actual shutter 220 is closed to a position of 60%, for example, the display control section 103 returns the shutter 412a within the shutter image 412 being displayed in the opening direction (corresponding to an example of the second direction) by an amount of 40% (corresponding to an example of the first predetermined amount).

in S2428, the display control section 103 displays an alerting mark 600 on the shutter control screen 410. Next, the display control section 103 finely vertically vibrates the position of the shutter 412a within the shutter image 412 (S2429), and the process returns to S2401. In the embodiment of FIG. 18, S2428 may be omitted. In the embodiment of FIG. 19, in addition, S2429 may be omitted.

The loop of S2421, S2422, S2423, and S2424 of FIG. 24B corresponds to a case where there is not an obstacle. The path of S2421, S2425, S2426, S2428, and S2429 of FIG. 24B corresponds to a case where an obstacle is detected when the shutter 220 is closed to a position at which the shutter 220 is closed beyond a predetermined reference amount (in FIG. 24B, 70%, for example). The path of S2421, S2425, S2427, S2428, and S2429 of FIG. 24B corresponds to a case where an obstacle is detected when the shutter 220 is closed to a position at which the shutter 220 is closed by the predetermined reference amount (in FIG. 24B, 70%, for example) or less (including before the shutter 220 starts moving).

In FIG. 24B, if the actual shutter 220 is not closed to a position at which the shutter is closed beyond 70% (NO in S2425), the display control section 103 returns the shutter 412a within the shutter image 412 being displayed to the actual position (S2427). That is, the display control section 103 returns the shutter 412a within the shutter image 412 to a position at which the shutter 220 has been stopped because of detection of an obstacle.

It should be noted, however, that if the shutter 412a within the shutter image 412 were returned to a position at which the shutter 220 has been stopped without exception, the width of the return of the shutter 412a within the shutter image 412 on the shutter control screen 410 would be small in the case where the obstacle is small. As a result, the user might not notice that the shutter 412a within the shutter image 412 was returned.

Thus, in FIG. 24B, if the actual shutter 220 is closed to a position at which the shutter 220 is closed beyond the predetermined reference amount (in FIG. 24B, 70%, for example) (YES in S2425), the display control section 103 returns the shutter 412a within the shutter image 412 being displayed to a position of the predetermined reference amount (in FIG. 24B, 70%, for example) (S2426). This makes it easier for the user to notice that the shutter 412a within the shutter image 412 has been returned. The predetermined reference amount of 70% is exemplary, and the predetermined reference amount may have a different value such as 60%.

In FIG. 24B, the shutter 412a within the shutter image 412 being displayed is returned to a position of 70% (S2426) or the actual position at which the shutter 220 has been stopped (S2427), depending on the actual position at which the shutter 220 has been stopped. However, the present disclosure is not limited thereto. For example, as described with reference to FIG. 18, the shutter 412a within the shutter image 412 may be returned to a half open position (50%) without exception irrespective of the actual position at which the shutter 220 has been stopped.

Figure 25:
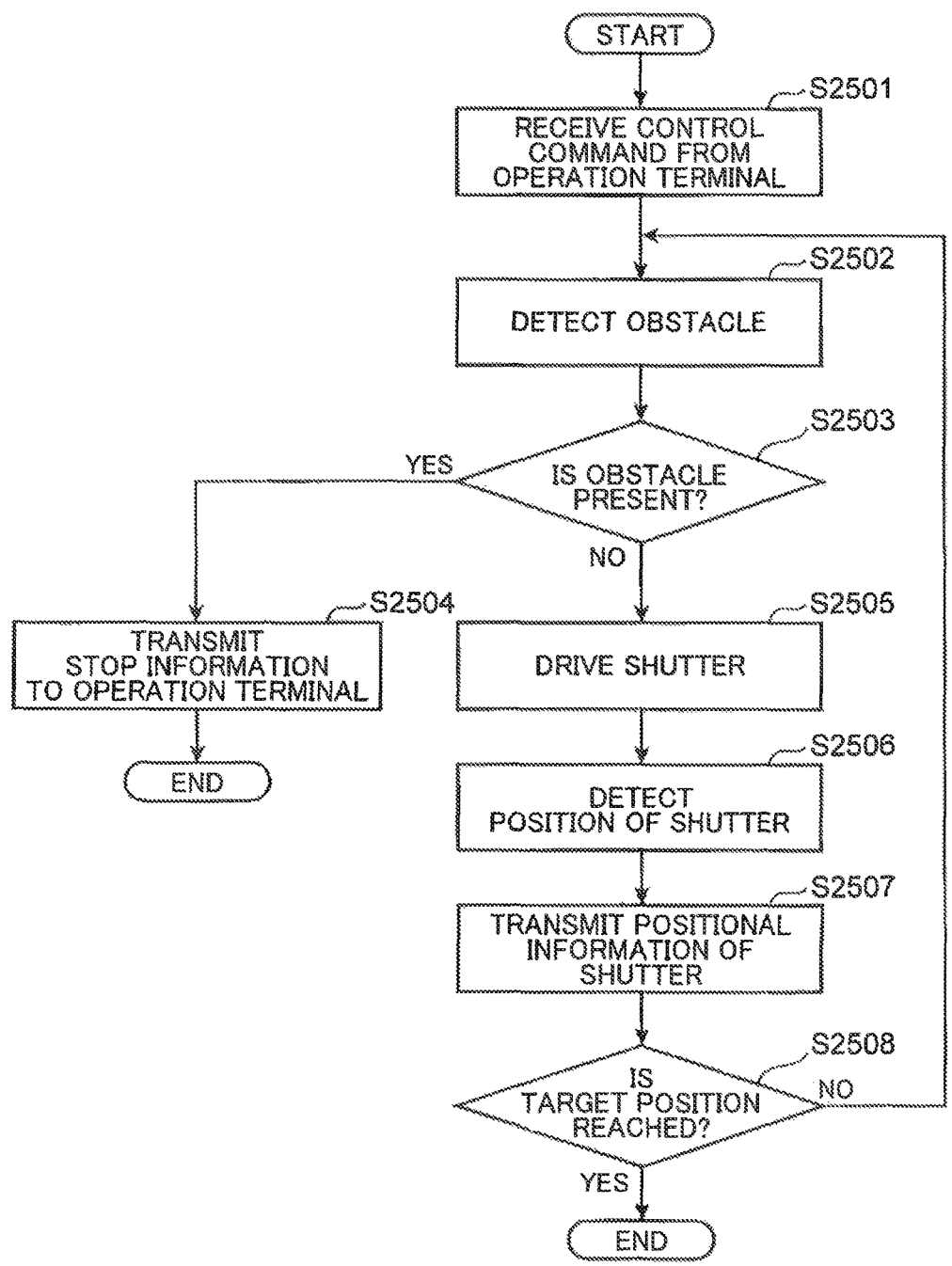
FIG. 25 is a flowchart showing a process flow in the electric shutter device for a case where an obstacle is taken into consideration.

FIG. 25 is a flowchart showing a process flow in the electric shutter device 200 for a case where an obstacle is taken into consideration.

First, the communication control section 214 of the electric shutter device 200 receives a control command transmitted from the operation terminal 100, and delivers the control command to the shutter control section 213 (S2501). Then, the shutter control section 213 acquires the result of detection performed by the obstacle sensor 215 (S2502). Next, the shutter control section 213 judges, on the basis of the result of detection performed by the obstacle sensor 215, whether or not there is an obstacle (S2503). If there is an obstacle in S2503 (YES in S2503), the process is advanced to S2504. If there is not an obstacle (NO in S2503), the process is advanced to S2505.

In S2504, the shutter control section 213 controls the drive section 211 so as to stop the shutter 220 if the shutter 220 is moved. In S2504, in addition, upon receiving a request from the shutter control section 213, the communication control section 214 transmits stop information indicating that movement of the shutter has been stopped to the operation terminal 100. Then, the flow is terminated.

S2505 to S2507 are the same as S1702 to S1704 of FIG. 17. Subsequent to S2507, the shutter control section 213 judges, on the basis of the position of the shutter 220 acquired in S2506, whether or not the shutter 220 has reached the target position indicated by the control command (S2508). If the shutter 220 has not reached the target position (NO in S2508), the process returns to S2502. If the shutter 220 has reached the target position in S2508 (YES in S2508), on the other hand, the flow is terminated.

Figure 26:
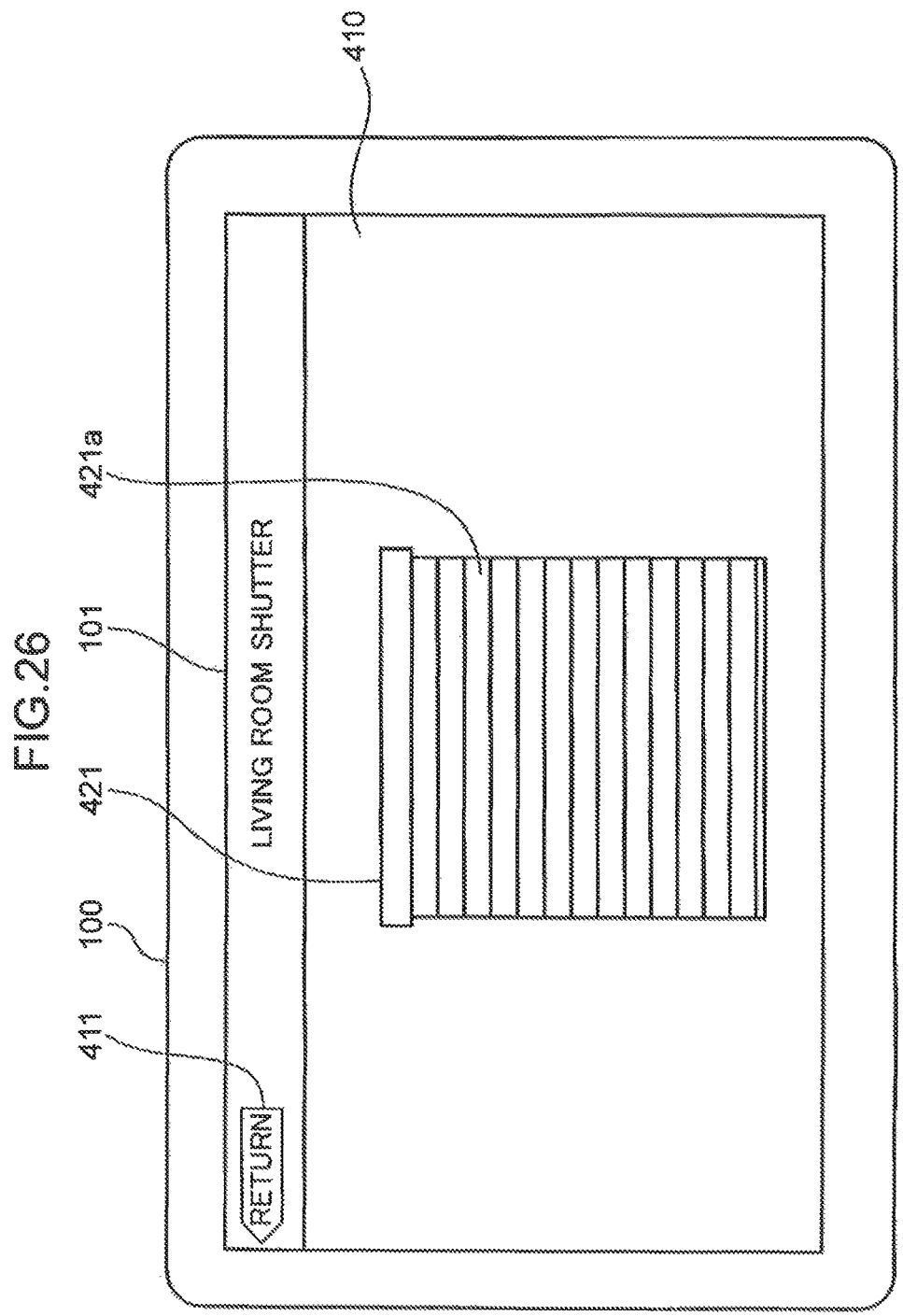
FIG. 26 is a diagram showing an example, different from FIG. 9, of the shutter control screen displayed on the display of the operation terminal.

FIG. 26 is a diagram showing an example, different from FIG. 9, of a shutter control screen 410 displayed on the display 101 of the operation terminal 100. The shutter control screen 410 shown in FIG. 26 is an operation screen that allows performing an open/close operation for the shutter 230 of the electric shutter device 201. As described with reference to FIG. 4, the shutter 230 is used as a storm sash provided at the window 320.

The shutter control screen 410 includes a return button 411, and a shutter image 421 representing the shutter 230 of the electric shutter device 201. The shutter image 421 includes a shutter 421a. In addition, a text "LIVING ROOM SHUTTER" is affixed to the shutter control screen 410 in FIG. 26. This allows the user to easily understand that the screen is a control screen for a shutter used as a storm sash provided at the window.

When the user selects the select button 405B with a contacting object (for example, one finger of the user) in the shutter select screen 400 shown in FIG. 8, the touch panel control section 102 senses the selection. Then, as shown in FIG. 26, the display control section 103 displays the shutter control screen 410 corresponding to the select button 405B on the display 101.

Moreover, when the user selects the return button 411 with the contacting object in the shutter control screen 410 shown in FIG. 26, the touch panel control section 102 senses the selection. Then, the display control section 103 returns the display on the display 101 to the shutter select screen 400 shown in FIG. 8.

Figure 27:
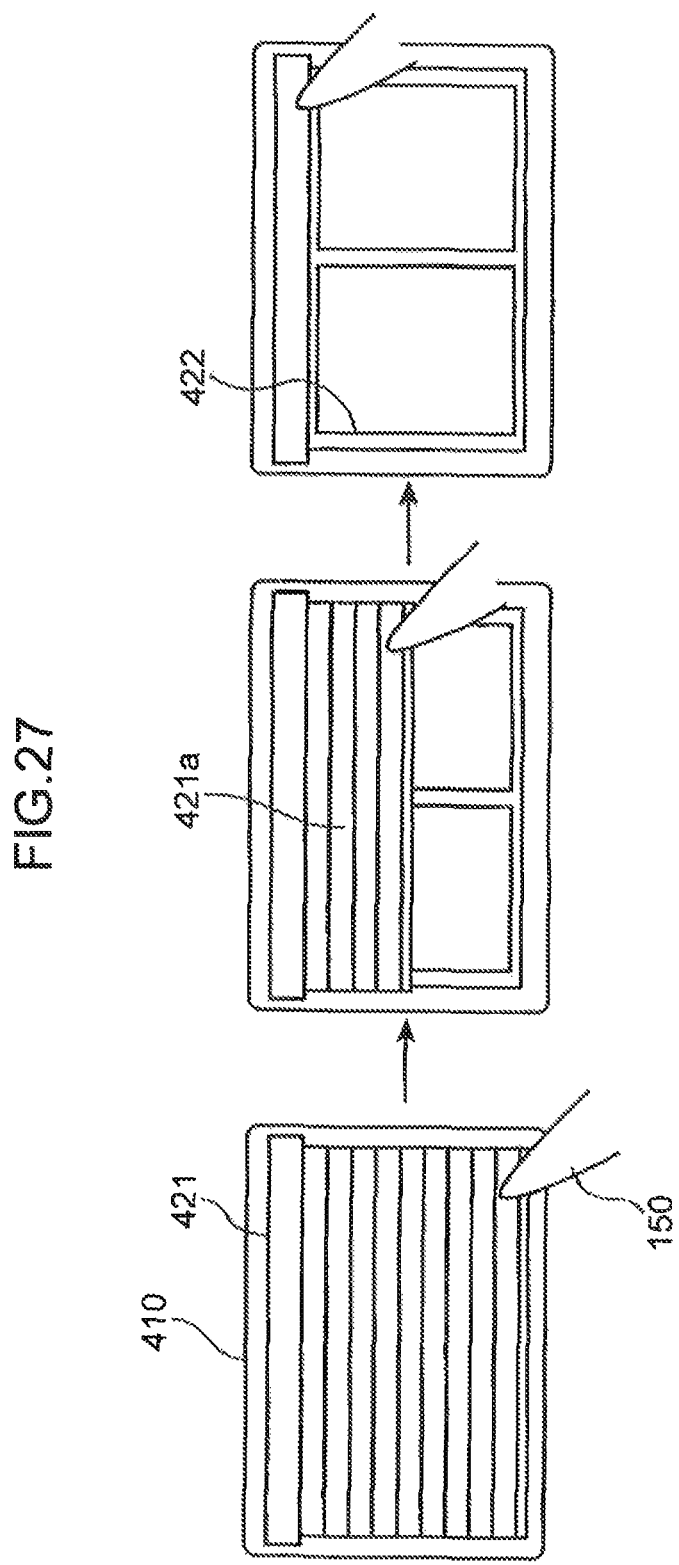
FIG. 27 is a diagram showing an example of display on the shutter control screen and an example of an operation by a contacting object when opening the shutter.
Figure 28:
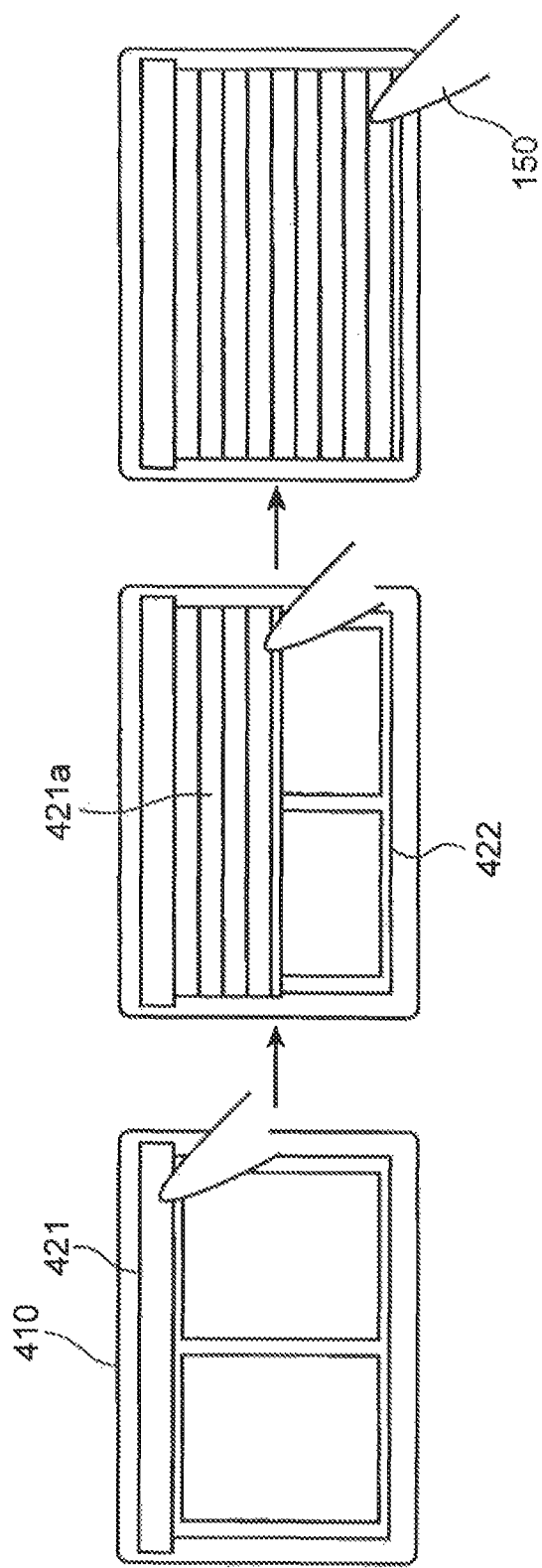
FIG. 28 is a diagram showing an example of display on the shutter control screen and an example of an operation by the contacting object when closing the shutter.

FIG. 27 is a diagram showing an example of display on the shutter control screen 410 and an example of an operation by a contacting object 150 when opening the shutter 230. FIG. 28 is a diagram showing an example of display on the shutter control screen 410 and an example of an operation by the contacting object 150 when closing the shutter 230.

First, an operation of opening the shutter 230 of the electric shutter device 201 will be described with reference to FIG. 27. The shutter image 412 in which the shutter 412a is fully closed is displayed (the left diagram of FIG. 27). In this state, the touch panel control section 102 senses an upward swipe operation by the contacting object 150 (for example, one finger of the user) on the shutter control screen 410 (the left diagram to the middle diagram of FIG. 27).

Then, the display control section 103 moves the shutter 421a within the shutter image 421 in the opening direction in accordance with movement of the contacting object 150 (the middle diagram of FIG. 27). At this time, the display control section 103 displays a window image 422 representing the window 320 which has been hidden behind the shutter in a region corresponding to the shutter image 421 as the shutter 421a within the shutter image 421 is opened.

In the middle diagram of FIG. 27, the lower half of the window image 422 has appeared. In order to achieve image display such as that in the middle diagram of FIG. 27, for example, the shutter 421a within the shutter image 421 may be provided in a first layer, the window image 422 may be provided in a second layer, and the order of priority for image display of the first layer may be made higher than that of the second layer.

Further, if the upward swipe operation by the contacting object 150 is continued, the touch panel control section 102 senses the swipe operation (the middle diagram to the right diagram of FIG. 27). Then, when the shutter 421a within the shutter image 421 is fully open, the display control section 103 erases the shutter 421a, and displays the window image 422 representing the entire window (the right diagram of FIG. 27).

When the touch panel control section 102 senses an upward swipe operation by the contacting object 150 on the shutter control screen 410, the shutter control section 105 generates a control command (corresponding to an example of the movement control command) for opening the shutter 230 of the electric shutter device 201. At this time, the shutter control section 105 decides the target position for the opening shutter on the basis of the amount of movement of the swipe operation by the contacting object 150.

When the user finishes the upward swipe operation in the state shown in the middle diagram of FIG. 27, for example, the shutter control section 105 decides a position at which the shutter is half open as the target position for the opening shutter. In this case, the display control section 103 renders the shutter 421a within the shutter image 421 half open as shown in the middle diagram of FIG. 27. Display of the shutter 421a allows the user to easily understand the target position for the shutter.

When the user finishes the upward swipe operation in the state shown in the right diagram of FIG. 27, for example, the shutter control section 105 decides a position at which the shutter is fully open as the target position for opening and closing of the shutter. In this case, the display control section 103 erases the shutter 421a within the shutter image 421 as shown in the right diagram of FIG. 27 to indicate that the target position for opening and closing of the shutter is the fully open position.

When the target position is decided, the shutter control section 105 generates a control command for opening the shutter 230 to the decided target position. The shutter control section 105 generates a control command corresponding to the decided target position. That is, the shutter control section 105 generates a control command (corresponding to an example of the distance control command) for opening the shutter 230 of the electric shutter device 201 for a distance corresponding to the amount of movement of the swipe operation by the contacting object 150.

The communication control section 106 transmits the generated control command to the control unit 210 of the electric shutter device 201. The shutter control section 213 of the electric shutter device 201 receives the control command transmitted from the operation terminal 100 via the communication control section 214. The shutter control section 213 controls the drive section 211 to start operation of opening the shutter 230 in accordance with the received control command.

Next, an operation of closing the shutter 230 of the electric shutter device 201 will be described with reference to FIG. 28. The shutter image 421 in which the shutter is fully open is displayed, and the window image 422 representing the entire window is displayed in a region corresponding to the shutter image 421 (the left diagram of FIG. 28). In this state, the touch panel control section 102 senses a downward swipe operation by the contacting object 150 on the shutter control screen 410 (the left diagram to the middle diagram of FIG. 28).

Then, the display control section 103 moves the shutter 421a within the shutter image 421 in the closing direction in accordance with movement of the contacting object 150 (the middle diagram of FIG. 28). At this time, the display control section 103 hides the window image 422 displayed in the region corresponding to the shutter image 421 behind the shutter 421a as the shutter 421a within the shutter image 421 is closed (the middle diagram of FIG. 28).

In the middle diagram of FIG. 28, the upper half of the window image 422 is hidden behind the shutter 421a. In order to achieve image display such as that in the middle diagram of FIG. 28, as described above, for example, the shutter 421a within the shutter image 421 may be provided in a first layer, the window image 422 may be provided in a second layer, and the order of priority for image display of the first layer may be made higher than that of the second layer.

Further, if the downward swipe operation by the contacting object 150 is continued, the touch panel control section 102 senses the swipe operation (the middle diagram to the right diagram of FIG. 28). Then, when the shutter 421a within the shutter image 421 is fully closed, the display control section 103 erases the window image 422 (the right diagram of FIG. 28).

When the touch panel control section 102 senses a downward swipe operation by the contacting object 150 on the shutter control screen 410, the shutter control section 105 generates a control command (corresponding to an example of the movement control command) for closing the shutter 230 of the electric shutter device 201. At this time, the shutter control section 105 decides the target position for the closing shutter on the basis of the amount of movement of the swipe operation by the contacting object 150.

When the user finishes the downward swipe operation in the state shown in the middle diagram of FIG. 28, for example, the shutter control section 105 decides a position at which the shutter is half closed as the target position for the closing shutter. In this case, the display control section 103 renders the shutter 421a within the shutter image 421 half closed as shown in the middle diagram of FIG. 28.

When the user finishes the downward swipe operation in the state shown in the right diagram of FIG. 28, for example, the shutter control section 105 decides a position at which the shutter is fully closed as the target position for the closing shutter. In this case, the display control section 103 renders the shutter 421a within the shutter image 421 fully closed as shown in the right diagram of FIG. 28.

When the target position is decided, the shutter control section 105 generates a control command for closing the shutter 230 to the decided target position. The shutter control section 105 generates a control command corresponding to the decided target position. That is, the shutter control section 105 generates a control command (corresponding to an example of the distance control command) for closing the shutter 230 of the electric shutter device 201 for a distance corresponding to the amount of movement of the swipe operation by the contacting object 150.

The communication control section 106 transmits the generated control command to the control unit 210 of the electric shutter device 201. The shutter control section 213 of the electric, shutter device 201 receives the control command transmitted from the operation terminal 100 via the communication control section 214. The shutter control section 213 controls the drive section 211 to start operation of closing the shutter 220 in accordance with the received control command.

As described above, the shutter control section 213 controls the drive section 211 to start operation of opening and closing the shutter 230 in accordance with the received control command. Specifically, operation of opening the shutter 230 is started in FIG. 27, and operation of closing the shutter 230 is started in FIG. 28. At this time, actual motion of the shutter 230 is slower than motion of the shutter 421*a* within the shutter image 421 displayed on the shutter control screen 410. Thus, as in the embodiment of FIGS. 10 to 13, the display control section 103 may display an image representing the actual position of an end portion of the shutter 230 as overlapped on the shutter 421*a* within the shutter image 421 on the shutter control screen 410.

INDUSTRIAL APPLICABILITY

The present disclosure provides a useful control method for controlling an electric shutter device connected to a network.

The invention claimed is:

1. A method for controlling an information apparatus, the information apparatus having a touch panel display and being connected to a network, an electric shutter device being controlled over the network, the electric shutter device being capable of opening and closing a shutter through a remote operation,
the method causing a processor of the information apparatus to:
display an operation icon on a display screen of the information apparatus, the operation icon causing an operation screen for the electric shutter device to be displayed;
display the operation screen for the electric shutter device when selection of the operation icon is sensed, the operation screen including a shutter image representing the shutter of the electric shutter device;
when a swipe operation is sensed on the operation screen, output to the network a movement control command for moving the shutter of the electric shutter device in a swipe direction of the swipe operation, wherein
movement of the shutter represented in the shutter image results in a changed representation of an object hidden by the shutter represented in the shutter image when the shutter image is in a closed position.

2. The method according to claim 1, wherein when the shutter represented in the shutter image is moved to a closed position, the object is hidden behind the shutter represented in the shutter image.

3. The method according to claim 1, wherein the object comprises a representation of a vehicle.

4. The method according to claim 1, wherein the object comprises a representation of a window.

5. The method according to claim 1, wherein the shutter represented in the shutter image comprises a representation of a closure to a garage.

6. The method according to claim 1, wherein the shutter represented in the shutter image comprises a representation of a covering to a window.

7. A method for controlling an information apparatus, the information apparatus having a touch panel display and being connected to a network, an electric closer being controlled over the network, the electric closer being capable of opening and closing a closure through a remote operation,
the method causing a processor of the information apparatus to:
display an operation icon on a display screen of the information apparatus, the operation icon causing an operation screen for the electric closer to be displayed;
display the operation screen for the electric closer when selection of the operation icon is sensed, the operation screen including a closure image representing the closure of the electric closer;
when a swipe operation is sensed on the operation screen, output to the network a movement control command for moving the closure of the electric closer in a swipe direction of the swipe operation, wherein
movement of the closure represented in the closure image results in a changed representation of an object hidden by the closure represented in the closure image when the closure image is in a closed position.

8. The method according to claim 7, wherein when the closure represented in the closure image is moved to a closed position, the object is hidden behind the closure represented in the closure image.

9. The method according to claim 7, wherein the object comprises a representation of a vehicle.

10. The method according to claim 7, wherein the object comprises a representation of a window.

11. The method according to claim 7, wherein the closure represented in the closure image comprises a representation of a door to a garage.

12. The method according to claim 7, wherein the closure represented in the closure image comprises a representation of a covering to a window.

* * * * *